United States Patent
Shin et al.

(10) Patent No.: US 12,462,878 B2
(45) Date of Patent: Nov. 4, 2025

(54) MEMORY DEVICE AND METHOD OF OPERATING THE SAME

(71) Applicant: SK hynix Inc., Icheon-si (KR)

(72) Inventors: Hyun Seob Shin, Icheon-si (KR); Dong Hun Kwak, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 190 days.

(21) Appl. No.: 18/317,362

(22) Filed: May 15, 2023

(65) Prior Publication Data

US 2024/0177776 A1    May 30, 2024

(30) Foreign Application Priority Data

Nov. 24, 2022 (KR) .......... 10-2022-0159153

(51) Int. Cl.
G11C 16/10 (2006.01)
G11C 16/04 (2006.01)
G11C 16/24 (2006.01)

(52) U.S. Cl.
CPC ........ G11C 16/102 (2013.01); G11C 16/0433 (2013.01); G11C 16/24 (2013.01)

(58) Field of Classification Search
CPC .... G11C 16/102; G11C 16/0433; G11C 16/24
USPC .................................. 365/189.011
See application file for complete search history.

(56) References Cited

U.S. PATENT DOCUMENTS

| 7,683,404 | B2* | 3/2010 | Jang ............... | H10D 84/038 |
| | | | | 438/109 |
| 9,287,291 | B2* | 3/2016 | Lue ............... | H10D 64/681 |
| 2010/0254194 | A1* | 10/2010 | Chou ............ | G11C 16/0475 |
| | | | | 365/185.21 |
| 2014/0056069 | A1* | 2/2014 | Park ............. | G11C 16/24 |
| | | | | 365/185.25 |
| 2021/0065773 | A1* | 3/2021 | Takekida ...... | G11C 16/08 |

FOREIGN PATENT DOCUMENTS

| KR | 1020140025164 A | 3/2014 |
| KR | 1020190057517 A | 5/2019 |
| KR | 1020200061253 A | 6/2020 |

* cited by examiner

*Primary Examiner* — Amir Zarabian
*Assistant Examiner* — Daniel J King
(74) *Attorney, Agent, or Firm* — WILLIAM PARK AND ASSOCIATES LTD.

(57) ABSTRACT

The present technology relates to an electronic device. According to the present technology, a memory device may include a plurality of memory cells, a read and write circuit, and a program controller. The plurality of memory cells may be connected to a plurality of channels passing through a plurality of word lines. The program controller may control the read and write circuit to perform a sensing operation on first memory cells and second memory cells among the plurality of memory cells during differently set sensing time periods. The first memory cells may be connected to first channels adjacent to a plurality of slits, among a plurality of channels separated by the plurality of slits. The second memory cells may be connected to second channels farther from the plurality of slits than the first channels.

20 Claims, 18 Drawing Sheets

MEMORY DEVICE AND METHOD OF OPERATING THE SAME

CROSS-REFERENCE TO RELATED APPLICATION

The present application claims priority under 35 U.S.C. § 119(a) to Korean patent application number 10-2022-0159153 filed on Nov. 24, 2022, in the Korean Intellectual Property Office, the entire disclosure of which is incorporated by reference herein.

BACKGROUND

1. Technical Field

The present disclosure relates to an electronic device, and more particularly, to a memory device and a method of operating the same. The memory device may perform an optimized read operation based on a read condition set which may differ according to a position and a characteristic of a memory cell.

2. Related Art

A storage device is a device that stores data under control of a host device such as a computer or a smartphone. A storage device may include a memory device in which data is stored and a memory controller controlling the memory device. The memory device is divided into a volatile memory device and a nonvolatile memory device.

A volatile memory device is a device that stores data while power is supplied to the memory device. A volatile memory device loses stored data when power to the memory device is interrupted or cut off. Volatile memory includes static random access memory (SRAM), a dynamic random access memory (DRAM), and the like.

A nonvolatile memory device is a device that does not lose data even when power is cut off. Nonvolatile memory includes read only memory (ROM), programmable ROM (PROM), electrically programmable ROM (EPROM), electrically erasable and programmable ROM (EEPROM), flash memory, and the like.

A memory device may perform a program operation while sensing a threshold voltage distribution of a memory cell. During programming, a memory device may improve the threshold voltage distribution by performing a sensing operation on the memory cell during different times, according to a position of a channel and a separation distance of a memory cell from an address decoder.

SUMMARY

An embodiment of the present disclosure provides a memory device having improved sensing and programming performance and a method of operating such a memory device.

According to an embodiment of the present disclosure, a memory device may include a plurality of memory cells, a read and write circuit, and a program controller. The plurality of memory cells may be connected to a plurality of channels passing through a plurality of word lines. The read and write circuit may perform a sensing operation on selected memory cells connected to a selected word line among the plurality of memory cells. The program controller may control the read and write circuit to perform a sensing operation on first memory cells and second memory cells among the selected memory cells during differently set sensing time periods. The first memory cells may be connected to first channels adjacent to a plurality of slits, among a plurality of channels separated by the plurality of slits. The second memory cells may be connected to second channels farther from the plurality of slits than the first channels.

According to an embodiment of the present disclosure, a method of operating a memory device may include performing a sensing operation during a first time period on first memory cells connected to first channels located away from a plurality of slits, performing a sensing operation, during a second time period different from the first time period, on second memory cells connected to second channels located farther away from the plurality of slits than the first channels. The first channels and the second channels pass through a plurality of word lines and are distinguished according to a distance from the plurality of slits.

According to the present technology, a memory device and a method of operating the same of which sensing performance and program performance are improved are provided.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification or application.

Figure 1:
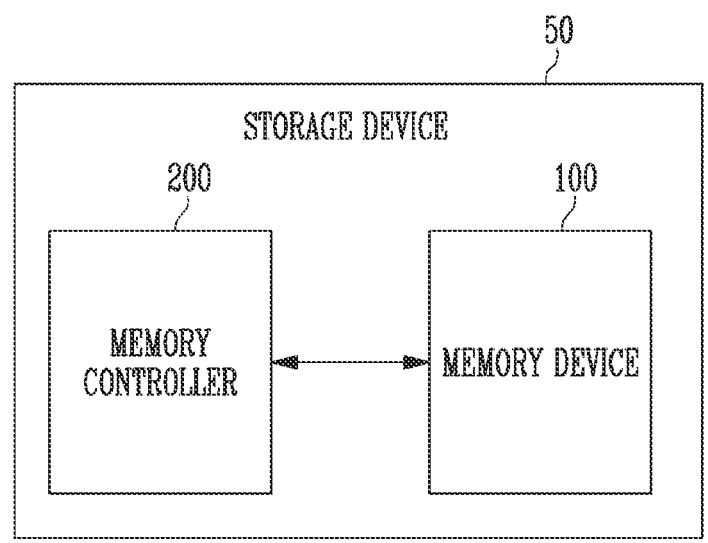
FIG. 1 is a diagram illustrating a storage device according to an embodiment of the present disclosure.

FIG. 1 FIG. 1 is a diagram illustrating a storage device 50 according to an embodiment of the present disclosure.

Referring to FIG. 1, the storage device 50 may include a memory device 100 and a memory controller 200. The memory controller 200 controls an operation of the memory device 100. The storage device 50 is a device that stores data under control of a host such as a cellular phone, a smartphone, an MP3 player, a laptop computer, a desktop computer, a game player, a TV, a tablet PC, or an in-vehicle infotainment system.

As used herein a "peripheral" is a device controlled by a host. A peripheral as well as a peripheral device, feeds data into or receives data from another device, such as a host. The host, in turn, controls the peripheral's operation. The storage device 50 may be manufactured as one of various different types of storage devices required by or compatible with according to a host interface, wherein a host interface is considered to be that is a circuit or device, which provides communication between a host, not shown in FIG. 1, and storage device 50.

A host interface includes a method, i.e., operating steps, which provide or enable bi-directional data exchanges between a storage device 50 and the host. For example, the storage device 50 may be embodied or "configured" as any one of various types of storage devices such as an a solid state drive or SSD, a multimedia card in a form of an MMC, and an eMMC, a secure digital card in a form of an SD, a mini-SD, and a micro-SD, a universal serial bus (USB) storage device, a universal flash storage (UFS) device, a peripheral component interconnection (PCI) card type storage device, a PCI express (PCI-E) card type storage device, and a compact flash (CF) card.

The storage device 50 may be manufactured as any one of various types of packages. For example, the storage device 50 may be manufactured as any one of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data and operates under control of the memory controller 200. The memory device 100 may include a memory cell array including a plurality of memory cells that store data. The memory cell array may also include a plurality of memory blocks. Each memory block may include a plurality of memory cells. The memory cells comprising a memory block may be functionally split or subdivided into a plurality of memory pages. In an embodiment, a page may be a unit for storing data in the memory device 100 or a unit providing, i.e., reading out, data stored in the memory device 100.

The memory block may also include a unit for erasing data. In an embodiment, the memory device 100 may be a double data rate synchronous dynamic random access memory (DDR SDRAM), a NAND flash memory, a NOR flash memory, a resistive random access memory (RRAM), a phase-change random access memory (PRAM), a magneto resistive random access memory (MRAM), or the like. In the present specification, for convenience of description, it is assumed that the memory device 100 is a NAND flash memory.

The memory controller 200 controls overall operation of the storage device 50. More particularly, the memory device 100 portion of the storage device 50 is configured to receive from the memory controller 200, commands and addresses associated with commands. After a command and address are received by the memory device 100, an operation specified by the command is performed by the memory device 100 at a location or locations where data is stored, the location or locations being selected by the address received by the memory device 100 from the memory controller 200. That is, the memory device 100 may perform an operation specified by the command on an area within the memory device 100, which is identified by the address received from the memory controller 200.

For example, the memory device 100 may perform a write operation (program operation), a read operation, and an erase operation. During a program operation, the memory device 100 may program data to an area selected by the address. During the read operation, the memory device 100 may read data from the area selected by the address. During the erase operation, the memory device 100 may erase data stored in the area selected by the address.

When power is applied to the storage device 50, the memory controller 200 may execute firmware FW, which can be stored within the memory controller 200 or within the memory device 100. Stored program instructions that comprise the firmware, are executed by a processor within and thus part of the memory controller 200. When the memory device 100 is a flash memory device, the memory controller 200 may execute firmware, such as a flash translation layer (FTL) for controlling communication between a host and the memory device 100.

In an embodiment, the memory controller 200 may receive data and a logical block address (LBA) from the host. The memory controller 200 may convert the LBA into a physical block address (PBA) indicating to the memory device 100, an address or addresses of memory cells in which data received from the host H, is to be stored in the memory device 100.

The memory controller 200 may control the memory device 100 to perform the program operation, the read operation, or the erase operation in response to a corresponding request sent to the storage device 50 by the host. During the program operation, the memory controller 200 may provide a write command, a physical block address, and data to the memory device 100. During the read operation, the memory controller 200 may provide a read command and the physical block address to the memory device 100. During the erase operation, the memory controller 200 may provide an erase command and the physical block address to the memory device 100.

In an embodiment, the memory controller 200 may generate and transmit a command, an address, and data to the memory device 100, regard less of the request from the host. For example, the memory controller 200 may provide a command, address, and data to the memory device 100, to perform background operations such as a program operation for wear leveling or a program operation for garbage collection.

In an embodiment, the memory controller 200 may be connected to and may be configured to control multiple memory devices 100. In this case, the memory controller 200 may control the memory devices 100 according to an interleaving method so as to improve operation performance. The interleaving method may be an operation method for overlapping operation periods of at least two memory devices 100.

The memory controller 200 may control a plurality of memory devices 100. Each memory device 100 may include at least one or more substantially planar semiconductor layers. Each layer may include a plurality of memory blocks.

The host may communicate with the storage device 50 using at least one of various communication methods such as a universal serial bus (USB), a serial AT attachment (SATA), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), and a dual in-line memory module (DIMM).

Figure 2:
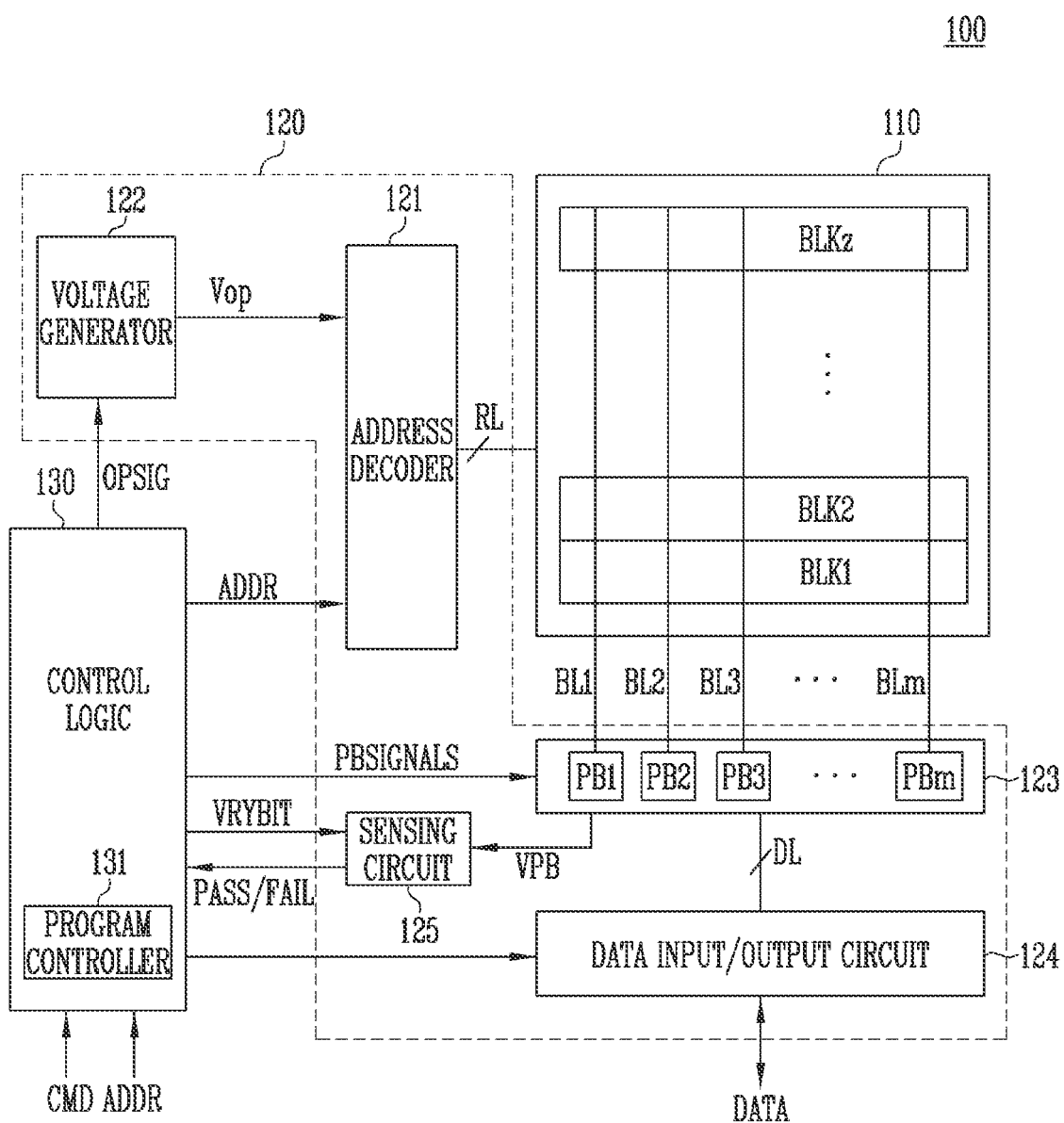
FIG. 2 is a diagram illustrating a structure of a memory device of FIG. 1.

FIG. 2 is a diagram illustrating a structure of the memory device of FIG. 1.

Referring to FIG. 2, the memory device 100 may include a memory cell array 110 comprising a plurality of memory blocks BLK1 to BLKz, a peripheral circuit 120, and a control logic 130. The plurality of memory blocks BLK1 to BLKz are connected to an address decoder 121 through a plurality of row lines RL. The plurality of memory blocks BLK1 to BLKz are connected to a read and write circuit 123 through bit lines BL1 to BLm. Each memory block of the plurality of memory blocks BLK1 to BLKz includes a plurality of memory cells, not shown in FIG. 2. In an embodiment, the plurality of memory cells are nonvolatile memory cells. Memory cells connected to the same word line (not shown in FIG. 2) among the plurality of memory cells are defined as one physical page. That is, the memory cell array 110 is configured of a plurality of physical pages. According to an embodiment of the present disclosure, each of the plurality of memory blocks BLK1 to BLKz included in the memory cell array 110 may include a plurality of dummy cells. At least one of the dummy cells may be connected in series between a drain select transistor and the memory cells and between a source select transistor and the memory cells.

Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) that stores four data bits.

In an embodiment, the memory cell array 110 may include a plurality of memory cells connected to a plurality of channels passing through a plurality of word lines. The plurality of channels may be divided by a plurality of slits. A structure of the memory cell array 110 may be described with reference to FIGS. 3A to 3C and 4A to 4C.

Still referring to FIG. 2, peripheral circuit 120 may include address decoder 121, voltage generator 122, read and write circuit 123, data input/output circuit 124, and sensing circuit 125.

The peripheral circuit 120, which is a peripheral device of the memory controller 200, controls or operates the memory cell array 110. For example, the peripheral circuit 120 may drive the memory cell array 110 to perform a program operation, a read operation, and an erase operation.

The address decoder 121 is connected to the memory cell array 110 through the row lines RL. The row lines RL may include drain select lines, word lines, source select lines, and a common source line. According to an embodiment of the present disclosure, the word lines may include normal word lines and dummy word lines. According to an embodiment of the present disclosure, the row lines RL may further include a pipe select line.

The address decoder 121 is configured to operate in response to control signal from control logic 130, which is embodied as combinational and sequential logic or, an equivalently programmed processor. The address decoder 121 receives an address ADDR from the control logic 130.

The address decoder 121 is configured to receive and decode a block address ADDR, which is provided to the address decoder 121 by the control logic 130. The address decoder 121 selects at least one memory block among the memory blocks BLK1 to BLKz according to the decoded block address. The address decoder 121 is configured to decode a row address of the received address ADDR. The address decoder 121 may select at least one word line among word lines of a selected memory block according to the decoded address. The address decoder 121 may apply an operation voltage, Vop, to the selected word line, which the address decoder 121 receives from the voltage generator 122.

During the program operation, the address decoder 121 may apply a program voltage to a selected word line and apply a pass voltage of a level less than that of the program voltage to unselected word lines.

During a sensing operation, the address decoder 121 may apply a sensing voltage to the selected word line and apply a sensing pass voltage of a level greater than that of the sensing voltage to the unselected word lines. The sensing operation may include a program verify operation and the read operation.

For example, during the program verify operation, the address decoder 121 may apply a verify voltage to the selected word line and apply a verify pass voltage of a level greater than that of the verify voltage to the unselected word lines. During the read operation, the address decoder 121 may apply a read voltage to the selected word line and apply a read pass voltage of a level greater than that of the read voltage to the unselected word lines.

According to an embodiment of the present disclosure, the erase operation of the memory device 100 is performed in a memory block unit. The address ADDR input to the memory device 100 during the erase operation includes a block address. The address decoder 121 may decode the block address and select at least one memory block according to the decoded block address. During the erase operation, the address decoder 121 may apply a ground voltage to the word lines input to the selected memory block.

According to an embodiment of the present disclosure, the address decoder 121 may be configured to decode a column address of the transmitted address ADDR. The decoded column address may be transmitted to the read and write circuit 123. In an example, the address decoder 121 may include a component such as a row decoder, a column decoder, and an address buffer.

The voltage generator 122 operates in response to signals, OPSIG, the voltage generator 122 receives from the control logic 130. The voltage generator 122 is configured to generate a plurality of different operation voltages Vop, which are selected by OPSIG signals output from the control logic 130.

In an embodiment, the voltage generator 122 may generate an internal power voltage from the external power voltage. The internal power voltage generated by the voltage generator 122 may be used as an operation voltage for the memory device 100.

In an embodiment, the voltage generator 122 may generate the plurality of operation voltages Vop using the external power voltage or the internal power voltage. The voltage generator 122 may be configured to generate voltages of various different magnitudes (and polarity) required by the memory device 100. For example, the voltage generator 122 may generate a plurality of erase voltages, a plurality of program voltages, a plurality of pass voltages, a plurality of selection read voltages, and a plurality of non-selection read voltages, which may be different from each other.

In order to generate the plurality of operation voltages Vop having various voltage levels, the voltage generator 122 may include a plurality of pumping capacitors that receive the internal voltage and selectively activate the plurality of pumping capacitors in response to the control logic 130 to generate the plurality of operation voltages Vop. The plurality of generated operation voltages Vop may be supplied to the memory cell array 110 by the address decoder 121.

Still referring to FIG. 2, the read and write circuit 123 includes first to m-th page buffers PB1 to PBm. The first to m-th page buffers PB1 to PBm are connected to the memory cell array 110 through first to m-th bit lines BL1 to BLm, respectively. The first to m-th page buffers PB1 to PBm operate in response to page buffer signals, PBSIGNALS, output to the read and write circuit 123 from the control logic 130.

The first to m-th page buffers PB1 to PBm exchange data DATA between the data input/output circuit 124 and the memory cell array 110. During programming, the first to m-th page buffers PB1 to PBm receive the data DATA to be stored, through the data input/output circuit 124 and data lines DL. When the program voltage is applied to the selected word line, the first to m-th page buffers PB1 to PBm may transmit the data DATA received through the data input/output circuit 124 to the selected memory cells in the memory cell array 110 through the bit lines BL1 to BLm. The memory cells of a selected page are programmed with the transmitted data DATA. A memory cell connected to a bit line to which a program permission voltage (for example, a ground voltage) is applied may have an increased threshold voltage. A threshold voltage of a memory cell connected to a bit line to which a program inhibition voltage (for example, a power voltage) is applied may be maintained. During the program verify operation, the first to m-th page buffers PB1 to PBm read the data DATA stored in the memory cells from the selected memory cells through the bit lines BL1 to BLm.

During the read operation, the read and write circuit 123 may read the data DATA from the memory cells of the selected page through the bit lines BL1 to BLm and store the read data DATA in the first to m-th page buffers PB1 to PBm.

During the erase operation, the read and write circuit 123 may float the bit lines BL1 to BLm. In an embodiment, the read and write circuit 123 may include a column select circuit.

In an embodiment, the read and write circuit 123 may apply a bit line voltage set according to the control of the control logic 130 to bit lines connected to the memory cells. The read and write circuit 123 may perform the sensing operation on the memory cells during a sensing time set according to the control of the control logic 130.

The data input/output circuit 124 is connected to the first to m-th page buffers PB1 to PBm through the data lines DL. The data input/output circuit 124 operates in response to control signals it receives from the control logic 130.

The data input/output circuit 124 may include a plurality of input/output buffers (not shown) that receive input data DATA. During the program operation, the data input/output circuit 124 receives the data DATA to be stored from an external controller (not shown in FIG. 2). During the read operation, the data input/output circuit 124 outputs the data DATA transmitted from the first to m-th page buffers PB1 to PBm included in the read and write circuit 123 to the external controller.

During the read operation or the verify operation, the sensing circuit 125 may generate a reference current in response to a signal of an allowable bit VRYBIT generated by the control logic 130 and may compare a sensing voltage VPB received from the read and write circuit 123 with a reference voltage generated by the reference current to output a pass signal or a fail signal to the control logic 130.

The control logic 130 may be connected to the address decoder 121, the voltage generator 122, the read and write circuit 123, the data input/output circuit 124, and the sensing circuit 125. The control logic 130 may therefore be configured to control all operations of the memory device 100. The control logic 130 may operate in response to a command CMD transmitted from an external device.

The control logic 130 may generate various signals in response to a command CMD the control logic 130 receives as well as an address ADDR, by which the control logic 130 controls the peripheral circuit 120. For example, the control logic 130 may generate and output an operation signal OPSIG, the address ADDR, a read and write circuit control signal PBSIGNALS, and the allowable bit VRYBIT, all in response to a command CMD and address ADDR. The control logic 130 may output the operation signal OPSIG to the voltage generator 122, output the address ADDR to the address decoder 121, output the read and write control signal to the read and write circuit 123, and output the allowable bit VRYBIT to the sensing circuit 125. In addition, the control logic 130 may determine whether the verify operation is passed or failed in response to the pass or fail signal PASS/FAIL output by the sensing circuit 125.

In an embodiment, the plurality of memory cells included in the memory cell array 110 may be connected to the plurality of channels passing through the plurality of word lines.

In an embodiment, the plurality of memory cells may be divided into first memory cells and second memory cells. The first memory cells and the second memory cells may be memory cells connected to the selected word line among the plurality of word lines.

The first memory cells may include memory cells connected to first channels adjacent to the plurality of slits among the plurality of channels. The second memory cells may include memory cells connected to second channels farther from the plurality of slits than the first channels among the plurality of channels. The first channel and the second channel are described in detail with reference to FIG. 6.

The first memory cells may include first near memory cells and first far memory cells, the difference between them being made according to their respective physical separation distances from the circuitry comprising the address decoder 121 shown in FIG. 2. The first near memory cells may be located physically closer, i.e., nearer the address decoder 121, than the first far memory cells. Similarly, the second memory cells may include second near memory cells and second far memory cells, the difference between them being their relative distance from the address decoder 121. The second near memory cells may be closer to the address decoder 121 than the second far memory cells.

In an embodiment, the control logic 130 may include a program controller 131.

The program controller 131 may control the address decoder 121 and the read and write circuit 123 to perform the sensing operation and the program operation on the memory cell array 110. The sensing operation may include the read operation and the program verify operation.

The program controller 131 may control the read and write circuit 123 to perform the sensing operation during differently set times on the first memory cells and the second memory cells. In an embodiment, the program controller 131 may control the read and write circuit 123 to perform the sensing operation on the second memory cells during a time period the duration of which is shorter than the duration of a sensing time for the first memory cells. In an embodiment, the program controller 131 may control the read and write circuit 123 to perform the sensing operation on the second far memory cells during a time period shorter than that of a sensing time period for the first memory cells and the second near memory cells, simply because near and far memory cell distances to the address decoder 121 are different, and as a result, the time required for signals to propagate between near and far memory cells, and the address decoder, will also be different.

In an embodiment, the program controller 131 may control the read and write circuit 123 to apply different bit line voltages to first bit lines connected to the first memory cells and second bit lines connected to the second memory cells during the program operation. Stated another way, the program controller 131 may control the read and write circuit 123 during the program operation to apply a first bit line voltage of a first magnitude to the first bit lines and, apply a different and lesser-magnitude voltage to the second bit lines during the program operation. The program controller 131 may control the read and write circuit 123 to apply a bit line voltage less than that of a previous program loop to the second bit lines as a program loop is progressed.

In an embodiment, the program controller 131 may control the read and write circuit 123 to apply different bit line voltages to third bit lines connected to the second near memory cells and fourth bit lines connected to the second far memory cells among the second bit lines during the program operation. The program controller 131 may control the read and write circuit 123 to apply a bit line voltage less than that of the first bit lines to the second bit lines and apply a bit line voltage less than that of the third bit lines to the fourth bit lines during the program operation. The program controller 131 may control the read and write circuit 123 to apply a bit line voltage less than a previous program loop to the third bit lines and the fourth bit lines as the program loop is progressed.

Figure 3A:
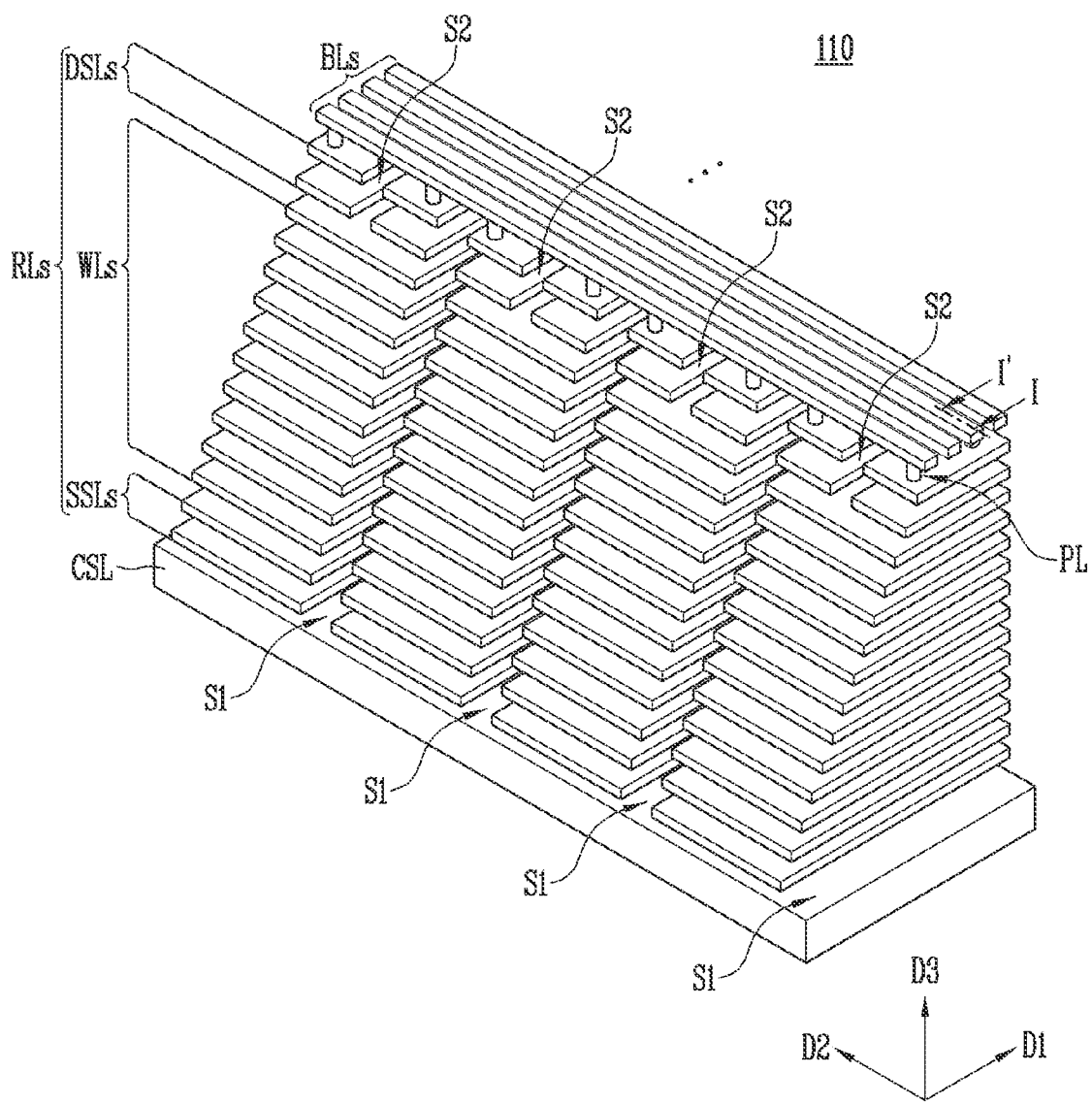
FIGS. 3A to 3C are diagrams illustrating an embodiment of a memory cell array.
Figure 3B:
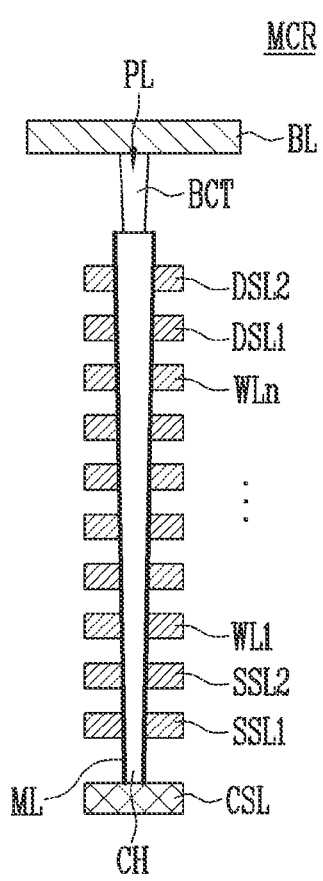
Figure 3C:
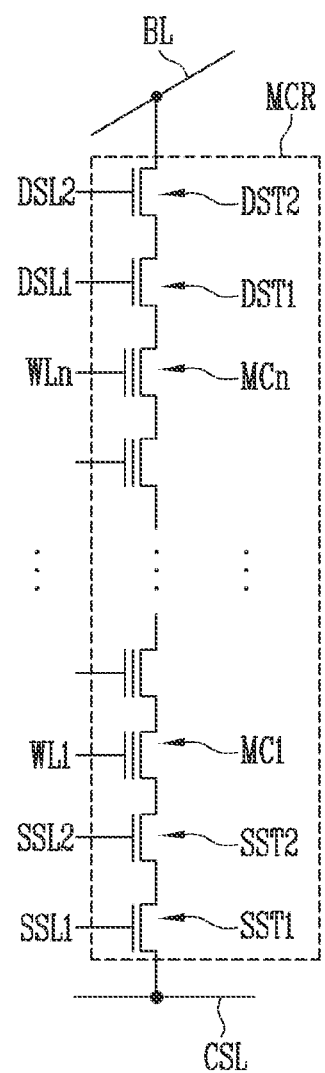

FIGS. 3A to 3C are diagrams illustrating an embodiment of the memory cell array 110. FIG. 3A illustrates the structure of the memory cell array 110. FIG. 3B is a cross-sectional view of a memory string MCR taken along a line I-I' shown in FIG. 3A. FIG. 3C illustrates an equivalent circuit diagram of the memory string MCR shown in FIG. 3B.

Referring to FIG. 3A, the memory cell array 110 may include pillars PL connected between a common source line CSL and bit lines BLs, and row lines RLs surrounding the pillars PL. The row lines RLs may include source select lines SSLs, word lines WLs, and drain select lines DSLs.

The source select lines SSLs may be disposed on the common source line CSL. In an embodiment, the source select lines SSLs may be disposed to be spaced apart from each other in a second direction D2 on a single layer. In an embodiment, the source select lines SSLs may be disposed to be spaced apart from each other in the second direction D2 on each of two or more layers, spaced apart from each other in a third direction D3 orthogonal to the second direction D2.

The word lines WLs may be disposed on (above) the source select lines SSLs. The word lines WLs above the source select lines, SSLs, may be stacked to be spaced apart from each other in the third direction D3.

The drain select lines DSLs may be disposed on (above) the word lines WLs. In an embodiment, the drain select lines DSLs may be disposed to be spaced apart from each other in the second direction D2 on a single layer. In an embodiment, the drain select lines DSLs may be disposed to be spaced apart from each other in the second direction D2 on each of two or more layers, which are spaced apart from each other in the third direction D3.

The row lines RLs may be separated from each other in the second direction D2 by first slits S1. The row lines RLs and the first slits S1 may extend in a first direction D1. The first slits S1 may be arranged in the second direction D2.

Among the row lines RLs disposed between the first slits S1 adjacent to each other in the second direction D2, the drain select lines DSLs disposed on the same layer may be separated from each other by second slits S2. Accordingly, the pillars PL shared by each of the word lines WLs may be separated by the second slit S2 and may be divided into sub-groups controlled by each of the drain select lines disposed on the same layer. In an embodiment, one second slit S2 may be disposed between the first slits S1 adjacent to each other in the second direction D2. An embodiment of the present disclosure is not limited thereto. For example, two or more second slits parallel to each other may be disposed between the first slits S1 adjacent to each other in the second direction D2.

The row lines RLs disposed between first slits S1 adjacent to each other in the second direction D2, may comprise one stack group. Each of the memory blocks BLK1 to BLKz shown in FIG. 2 may include one stack group or a plurality of stack groups.

Referring to FIG. 3B, and as shown in FIG. 3C, a memory string MCR may comprise drain select lines, DSLs, and word lines, WLs and source select lines, SSLs, through which a pillar, PL connected between a bit line BL and the common source line CSL, passes through.

Each pillar PL may include a substantially column-shaped semiconductor material referred to herein as a channel CH. As the figure shows, the channel CH is formed in such a way that it penetrates or "passes through" at least one or more source select lines (for example, SSL1 and SSL2), word lines WL1 to WLn, and at least one or more drain select line (for example, DSL1 and DSL2).

A substantially cylindrically-shaped sidewall of the channel CH may be surrounded by and in direct or substantially direct contact with a multilayer memory layer ML. The multilayer memory layer ML may include a data storage layer capable of storing data. The multilayer memory layer ML may further include a tunnel insulating layer not visible in FIG. 3B, disposed between the data storage layer and the channel CH. The multilayer memory layer ML may further include a blocking insulating layer, also not visible in FIG. 3B, extending along an outer wall of the data storage layer. The channel CH may include a semiconductor layer used as a channel area.

As shown in FIG. 3B, the channel CH is connected between the common source line CSL and the bit line BL. The top surface of the common source line CSL may contact a bottom surface of the channel CH. The bottom surface of the bit line BL may be electrically connected to the top surface of the channel CH via a bit contact plug, BCT.

Referring to FIG. 3C, the memory string MCR connected to the bit line BL and the common source line CSL may include at least one or more source select transistors (for example, SST1 and SST2), memory cells MC1 to MCn, and at least one or more drain select transistors (for example, DST1 and DST2).

Gates of the source select transistors SST1 and SST2 are connected to the source select lines SSL1 and SSL2. The source select transistors SST1 and SST2 are connected in series between the common source line CSL and a first memory cell MC1 through the channel CH shown in FIG. 3B. Gates of the drain select transistors DST1 and DST2 are connected to the drain select lines DSL1 and DSL2. The drain select transistors DST1 and DST2 are connected in series between the bit line BL and an n-th memory cell MCn through the channel CH shown in FIG. 3B. Gates of the memory cells MC1 to MCn are connected to the word lines WL1 to WLn. The memory cells MC1 to MCn are connected in series by the channel CH shown in FIG. 3B.

Figure 4A:
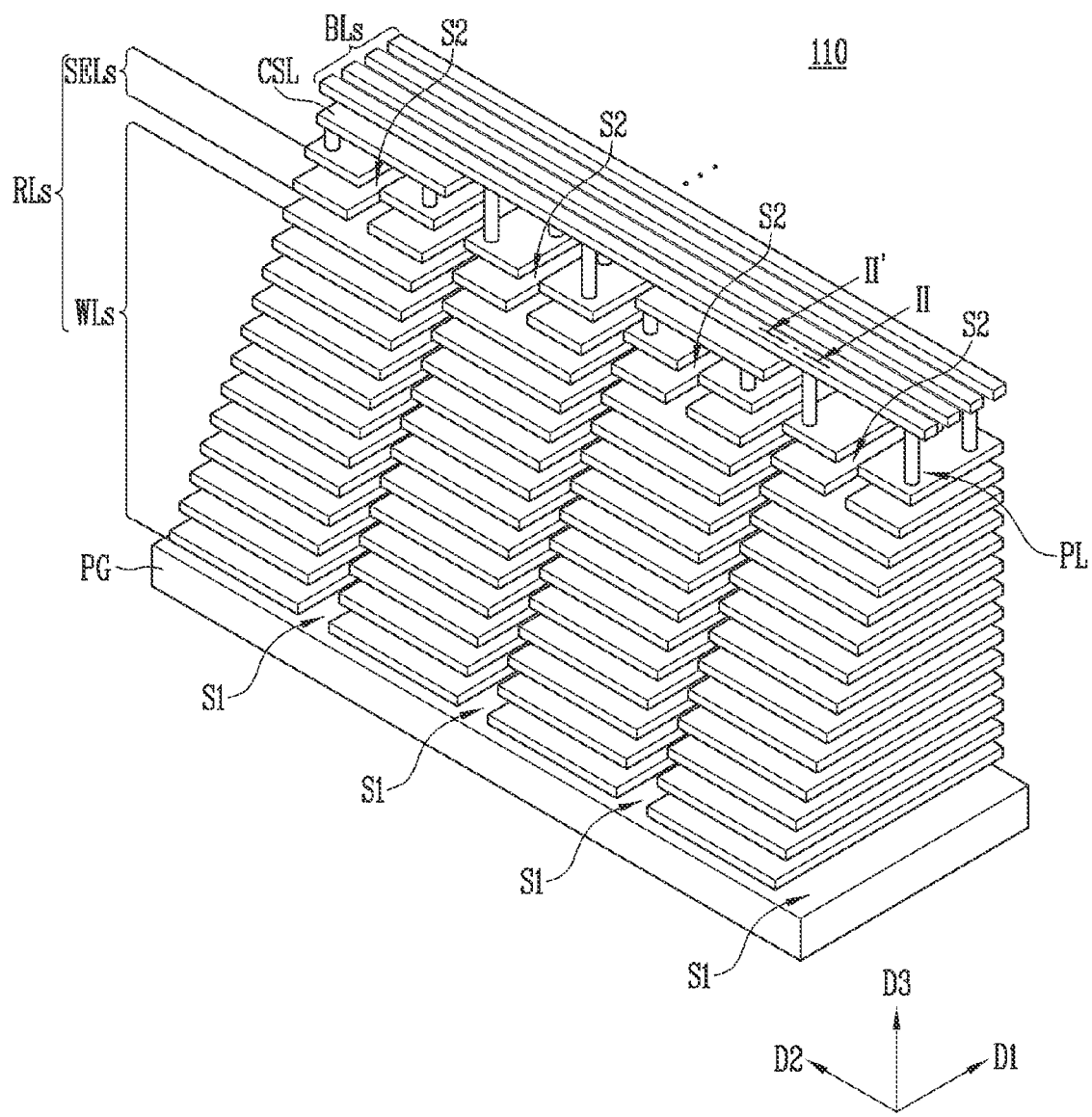
FIGS. 4A to 4C are diagrams illustrating an embodiment of the memory cell array.
Figure 4B:
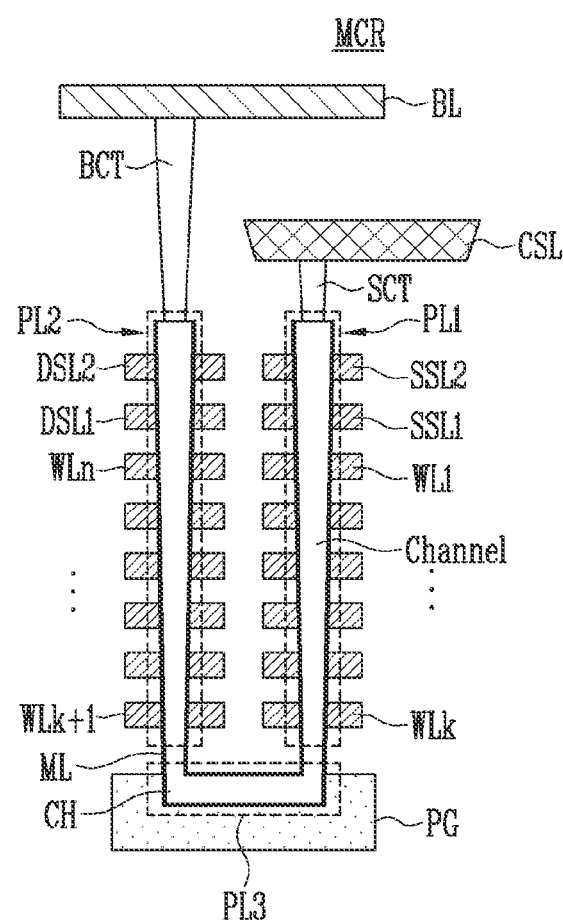
Figure 4C:
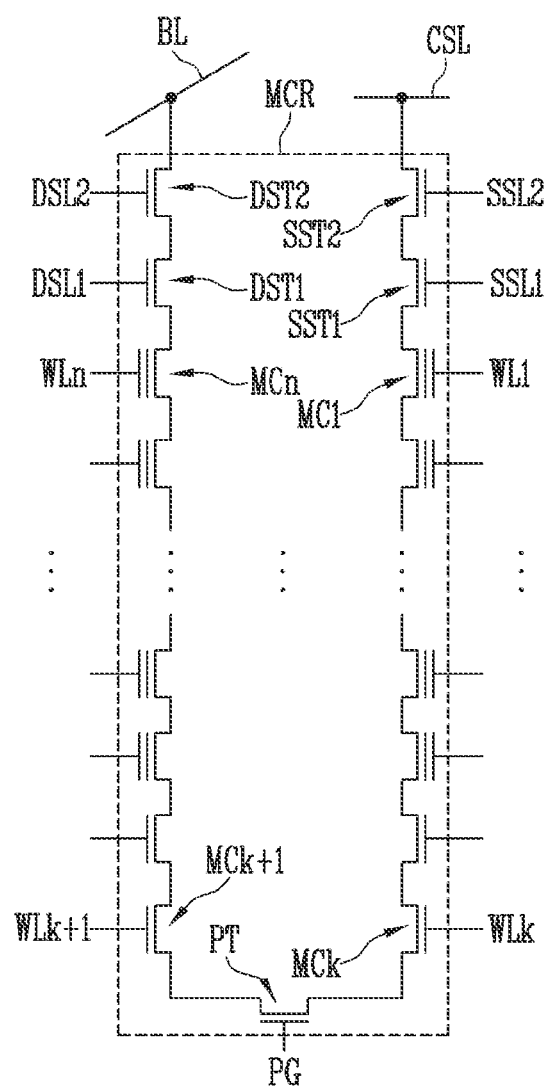

FIGS. 4A to 4C are diagrams illustrating an embodiment of the memory cell array. FIG. 4A illustrates the structure of the memory cell array 110. FIG. 4B is a cross-sectional view of a memory string MCR taken along a line II-II' shown in FIG. 4A. FIG. 4C illustrates an equivalent circuit diagram of the memory string MCR shown in FIG. 4B.

Referring to FIG. 4A, the memory cell array 110 may include pillars PL connected between a common source line CSL and bit lines BLs, and row lines RLs surrounding the pillars PL. The row lines RLs may include select lines SELs and word lines WLs.

The select lines SELs may be disposed under the common source line CSL and the bit lines BL1 to BLm. In an embodiment, the select lines SELs may be disposed to be spaced apart from each other in the second direction D2 on a single layer. In an embodiment, the select lines SELs may be disposed to be spaced apart from each other in the second direction D2 on each of two or more layers, which are spaced apart from each other in the third direction D3 orthogonal to the second direction D2.

The word lines WLs are disposed between a pipe gate PG and the select lines SELs, and are stacked to be spaced apart from each other in the third direction D3.

The row lines RLs may be separated from each other by first slits S1. The row lines RLs and the first slits S1 may extend in a first direction D1. The first slits S1 may be arranged in the second direction D2.

The word lines WLs may "overlap" second slits S2. Each second slit S2 is disposed between two, first slits S1, which are adjacent to each other in the second direction D2. Each second slit, S2, which is located between two first slits, S1, separates and thus defines select lines SELs disposed on the same layer.

The select lines SELs may be divided into a plurality of select groups by the first slits S1. Among the select groups, source select groups disposed at odd-numbered groups or even numbered groups in the second direction D2, overlap common source lines CSL, and remaining drain select groups are open between the common source lines CSL. The common source lines CSL may be disposed between the select lines SELs and the bit lines BLs included in source select groups.

The word lines WLs may be divided into a plurality of word groups by the first slits S1 adjacent to each other in the second direction D2. The word groups may be divided into first word groups overlapping the common source lines CSL and second word groups open between the common source lines CSL. The common source lines CSL may be connected to each other.

Still referring to FIGS. 4A-4C, each pillar PL includes sections or portions. The portions are physically connected to each other but discontinuous. The first and second portions are substantially vertical and substantially parallel to each other. They are both connected at their lower ends to the opposing ends of a substantially horizontal third portion. In FIG. 4B, the three portions are identified as PL1, PL2 and PL3. The first portion PL1 extends downwardly from the common source lines CSL, through the source select groups, SSL2 and SSL1, and through the first word group. The second portion PL2, extends downwardly from one of the bit lines BLs, through one of the drain select groups, DSL2 and DSL1, and through one of the second word groups, WLn-WLk+1. The third portion, PL3 is within the pipe gate PG and extends horizontally through the pipe gate PG and connects the bottom of the first portion, PL1 to the bottom of second portion, PL2.

In FIG. 2, memory blocks BLK1 to BLKz may include any one of the first word groups and any one of the second word groups, or include two or more first word groups and two or more second word groups.

Referring to FIG. 4C, a memory string MCR may be formed along each pillar PL, the portions of which are connected between the bit line BL and the common source line CSL.

As described above with reference to FIG. 4A, each pillar PL includes a first portion PL1, which passes through at least one or more source select lines (for example, SSL1 and SSL2) in a source select group corresponding thereto and source side word lines WL1 to WLk included in the first word group corresponding thereto. As described above with reference to FIG. 4A, each pillar PL includes a second portion PL2, which passes through at least one or more drain select lines (for example, DSL1 and DSL2) included in the drain select group corresponding thereto and drain side word lines WLn to WLk+1 included in the second word group corresponding thereto. As described above with reference to FIG. 4A, each pillar PL also includes a third portion PL3. The third portion PL3 passes through the pipe gate PG to connect the first portion PL1 and the second portion PL2.

Each pillar PL may include a channel CH, which may include a semiconductor having substantially cylinder-shaped outer surface or wall, surrounded by a substantially cylinder-shaped multilayer memory layer ML. As shown in FIG. 4B, the channel CH and any circumferential layers on the channel CH "extends" continuously through the first to third portions PL1 to PL3. As described above with reference to FIG. 3B, the multilayer memory layer ML may include a tunnel insulating layer, a data storage layer, and a blocking insulating layer. Those layers may be circumferential layers on the channel CH, which may also extend the entire length of PL1+PL2+PL3.

A channel CH comprised of all three portions, PL1, PL2 and PL3, may be considered as having opposing ends, which are respectively connected to the common source line CSL and the bit line BL. The common source line CSL may be electrically connected to a top end of the second portion PL2 of the channel CH via a source contact plug SCT. The bit line BL may be electrically connected to the top end of the first portion PL1 of the channel CH via the bit contact plug BCT.

Referring to FIG. 4C, the memory string MCR connected to the bit line BL and the common source line CSL may include at least one or more source select transistors (for example, SST1 and SST2), source side memory cells MC1 to MCk, and at least one or more drain select transistors (for example, DST1 and DST2).

Gates of the source select transistors SST1 and SST2 are connected to the source select lines SSL1 and SSL2. The source select transistors SST1 and SST2 are connected in series between the common source line CSL and a first memory cell MC1 through the channel CH shown in FIG. 4B. Gates of the drain select transistors DST1 and DST2 are connected to the drain select lines DSL1 and DSL2. The drain select transistors DST1 and DST2 are connected in series between the bit line BL and an n-th memory cell MCn through the channel CH shown in FIG. 4B. Gates of the source side memory cells MC1 to MCk are connected to the source side word lines WL1 to WLk. The source side memory cells MC1 to MCk are connected in series by the channel CH shown in FIG. 4B. Gates of the drain side memory cells MCk+1 to MCn are connected to drain side word lines WLk+1 to WLn. The drain side memory cells MCk+1 to MCn are connected in series by the channel CH shown in FIG. 4B. A (k+1)-th memory cell MCk+1 and a k-th memory cell MCk are connected in series by a pipe transistor PT. A pipe gate PG is used as a gate of the pipe transistor PT.

Each of the memory cells MC1 to MCn shown in FIGS. 3C and 4C may store 1 bit data or multi-bit data of 2 or more bits. A memory cell capable of storing 1 bit data is defined as a single level cell (SLC), and a memory cell capable of storing multi-bit data is defined as a multi-level cell (MLC). The SLC or the MLC may be programmed with data corresponding to a certain range of threshold voltage distribution. The MLC has a plurality of threshold voltage distributions corresponding to a plurality of program states. In this case, operation reliability of a three-dimensional memory device may be improved only when a width of a threshold voltage distribution for the same data is narrow. The width of the threshold voltage distribution may be widened due to various reasons.

Figure 5A:
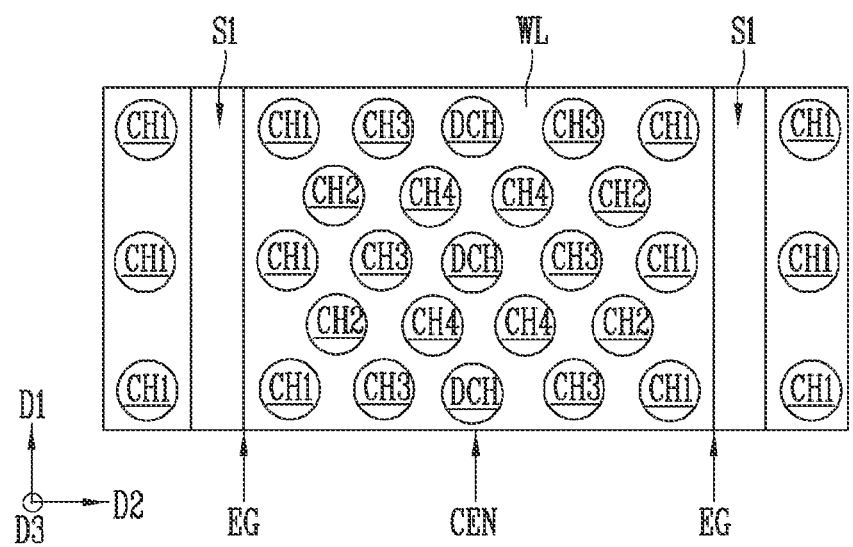
FIGS. 5A and 5B are plan views illustrating channels according to an embodiment of the present disclosure.
Figure 5B:
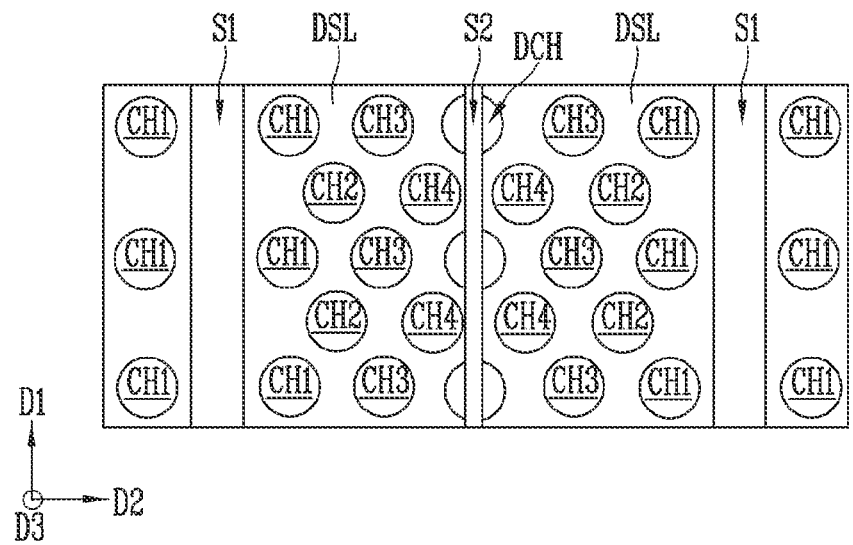

FIGS. 5A and 5B are plan views illustrating the top ends of portions of channels CH, according to an embodiment of the present disclosure. FIG. 5A is a plan view illustrating channels CH passing through word lines disposed on the same layer among the word lines WLs shown in FIG. 3A. FIG. 5A is considered herein as an example of channels CH passing through the word lines disposed on the same layer among the word lines WLs shown in FIG. 4A. FIG. 5B is a plan view illustrating an example of channels passing through drain select lines disposed on the same layer among the drain select lines DSLs shown in FIG. 3A. FIG. 5B is considered to be an example of the channels passing through the select lines disposed on the same layer among the select lines SELs shown in FIG. 4A.

Referring to FIGS. 5A and 5B, a plurality of channels CH1 to CH4 may be arranged between the first slits S1 adjacent to each other in the second direction D2. Each of the channels CH1 to CH4 may extend in the third direction D3 and pass through a word line WL and a drain select line DSL corresponding thereto.

Referring to FIG. 5A, the word line WL may include two or more columns of channels CH1 to CH4 passing through the word line WL and which are disposed toward, but not directly on a center area CEN of the word line WL from an edge EG of the word line WL. In an embodiment, the channels CH1 to CH4 passing through the word line WL may include first to fourth columns of channels CH arranged from the edge EG of the word line WL toward the center area CEN of the word line WL. Each column of the channels CH may include a plurality of channels CH disposed in the first direction D1. For example, the first column of channels CH may include first channels CH1 disposed in the first direction D1, the second column of channels CH may include second channels CH2 disposed in the first direction D1, the third column of channels may include third channels CH3 disposed in the first direction D1, and the fourth column of channels may include fourth channels CH4 disposed in the first direction D1. The channels CH1 to CH4 passing through the word line WL may be symmetrically arranged around an axis extending in the first direction D1 from the center area CEN of the word line WL.

In order to improve integration, the channels CH1 to CH4 may be arranged to form a zigzag pattern in the first direction D1 and the second direction D2. An embodiment of the present disclosure is not limited thereto. For example, the channels CH1 to CH4 may be arranged parallel to each other in the first direction D1 and the second direction D2.

Dummy channels DCH may pass through the center area CEN of the word line WL. The dummy channels DCH may be arranged in a row in the first direction D1. The channels CH1 to CH4 may be arranged symmetrically with respect to the dummy channels DCH.

Referring to FIG. 5B, the channels CH1 to CH4 and the dummy channels DCH described above with reference to FIG. 5A may extend in the third direction D3, which is into the plane of FIG. 5A, in order to pass through the drain select lines DSL. The second slits S2 (See FIGS. 3A and 4A) disposed between the first slits S1 adjacent to each other in the second direction D2, may extend to overlap the dummy channels DCH. The channels CH1 to CH4 may be symmetrically arranged with respect to the second slit S2.

Referring to FIGS. 5A and 5B again, shapes of the channels CH1 to CH4 may be different according to a desired or required separation distance from the first slits S1. The channels CH1 to CH4 extend through a stack structure of the word lines WLs shown in FIG. 3A or 4A. Forming the channels CH1 to CH4 may include forming holes corresponding to the channels CH1 to CH4 by etching each of stacks separated by the first slits S1. During an etching process of the stacks for forming the holes, side holes adjacent to the first slits S1 among the holes tend to be formed narrower than remaining holes. As a result, among the channels CH1 to CH4, the first column of first channels CH1 adjacent to the edge EG of the word line WL is formed narrower compared to remaining columns of channels (for example, CH2 to CH4).

As described above, widths and the shapes of the channels CH1 to CH4 are formed differently according to a separation distance of the channels CH1 to CH4 from the edge EG of the word line WL. Accordingly, programming speeds of memory cells connected to the channels CH1 to CH4 may be different from each other. Due to a programming speed difference of the memory cells, the width of the threshold voltage distribution may be widened.

An embodiment of the present disclosure may improve memory cell programming speeds of memory cells connected to the channels CH1 to CH4 according to the separation distance of the channels CH1 to CH4 from the edge EG of the word line WL by differentiating the bit line voltages during the program operation. Thus, an embodiment of the present disclosure may improve reliability of a three-dimensional memory device by decreasing the width of the threshold voltage distribution for the same program state.

Figure 6:
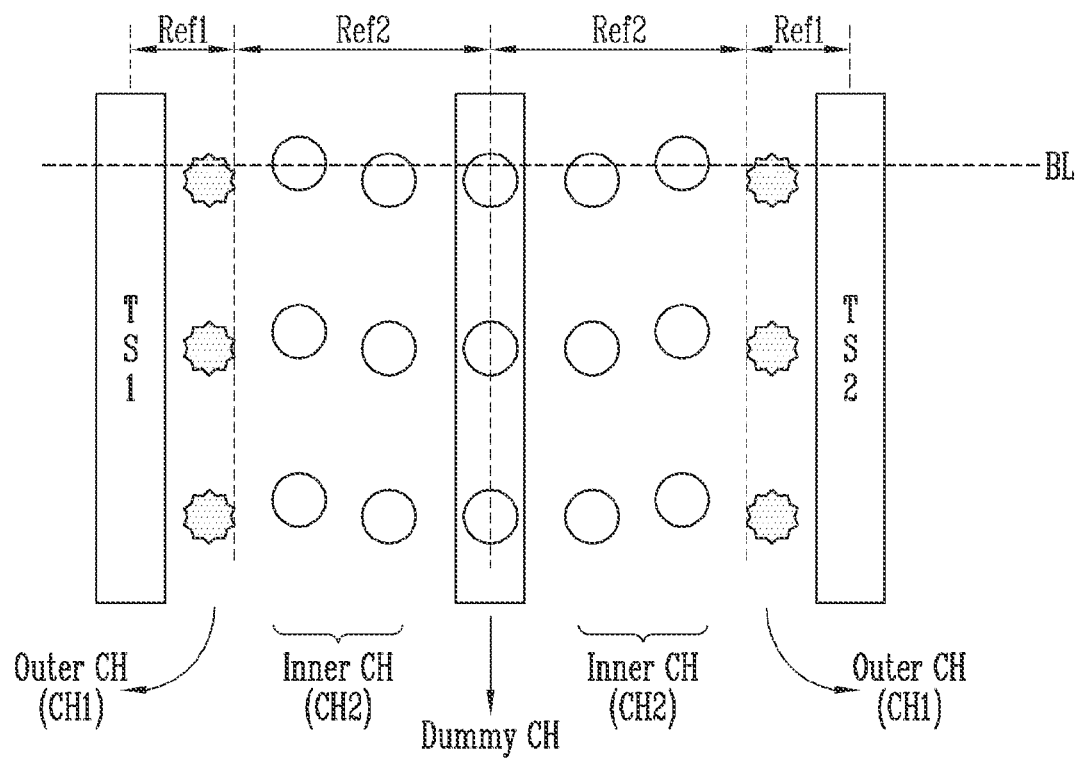
FIG. 6 is a diagram illustrating an inner channel and an outer channel divided according to a distance from adjacent slits.

FIG. 6 is a diagram illustrating an inner channel and an outer channel divided according to a distance from adjacent slits.

As described with reference to FIGS. 3A to 3C and 4A to 4C, the plurality of channels may be divided by the plurality of slits. A slit may be referred to as a word line cut. The plurality of channels may be divided into the inner channel and the outer channel according to a position with the slit.

In an embodiment, the plurality of slits may include a first target slit TS1 and a second target slit TS2 adjacent to each other. The first target slit TS1 and the second target slit TS2 may be slits adjacent to each other among the plurality of first slits S1 described with reference to FIG. 5A.

The first channels CH1 may include channels positioned within a reference distance Ref1 from the first target slit TS1 and the second target slit TS2. The second channels CH2 may include channels positioned outside the reference distance Ref1 from the first target slit and the second target slit. In another embodiment, the first channels CH1 may include channels positioned outside a reference distance Ref2 from a middle of the first target slit TS1 and the second target slit TS2. The second channels CH2 may include channels positioned within the reference distance Ref2 from the middle of the first target slit TS1 and the second target slit TS2. In an embodiment, the first channels CH1 may be outer channels Outer CH, and the second channels CH2 may be inner channels Inner CH.

In another embodiment, channels adjacent to the first target slit TS1 or the second target slit TS2 among the plurality of channels may be divided as the outer channel Outer CH. Among the plurality of channels, channels farther from the first target slit TS1 and the second target slit TS2 than the outer channel Outer CH may be divided as the inner channel Inner CH.

Figure 7:
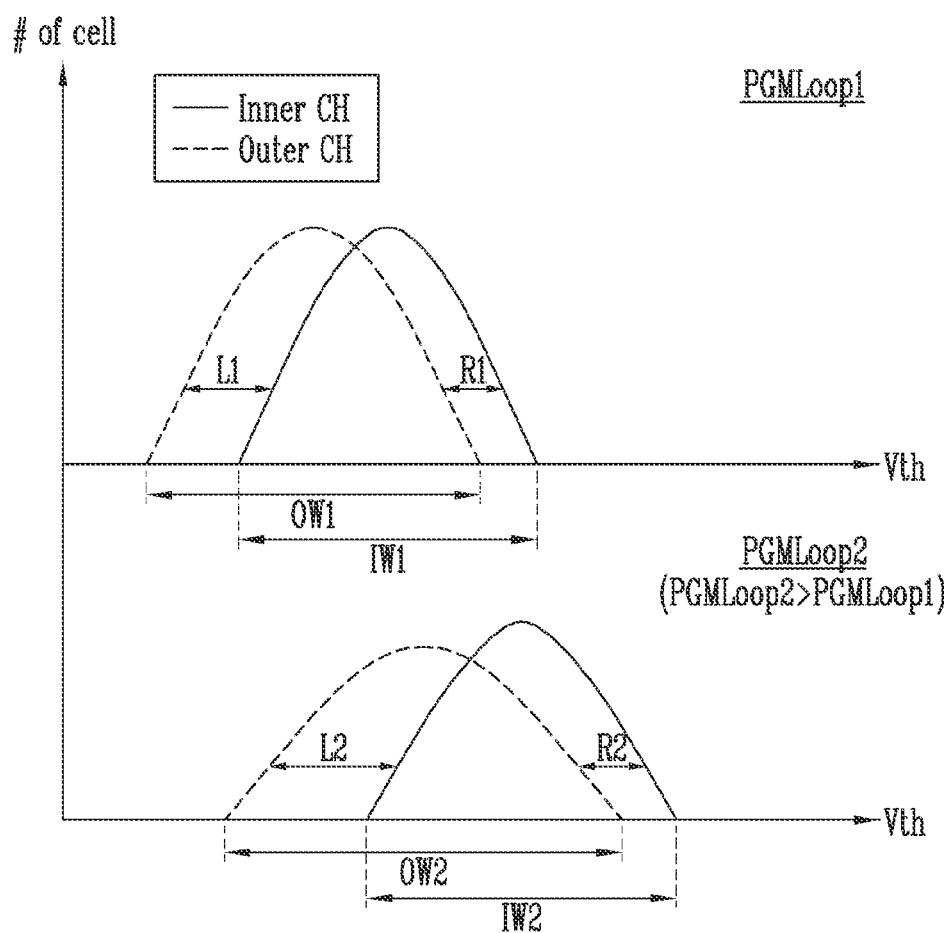
FIG. 7 is a diagram illustrating a threshold voltage distribution of memory cells as a program loop is executed for an inner channel and an outer channel.

FIG. 7 is a diagram illustrating the threshold voltage distribution of the memory cells as the program loop is progressed for each of the inner channel and the outer channel.

Referring to FIG. 7, compared to an inner channel, a peripheral panel of an outer channel may be uneven. Such unevenness may cause memory cells connected to the outer channel to have a word line resistance value greater than that of memory cells connected to the inner channel. As a result, programming speeds of memory cells connected to the outer channel may be less than the programming speeds of memory cells connected to the inner channel.

As used herein, the term program loop may refer to any one of a plurality of program loops performed during the programming operation. Since the speed at which the memory cells connected to the outer channel are programmed is, or might be, less than the speed at which memory cells connected to the inner channel are programmed, a threshold voltage Vth distribution of memory cells connected to the outer channel may be depicted on the left of the threshold voltage Vth distribution of memory cells connected to the inner channel.

In the program loop PGMLoop1, (In FIG. 7, refer to the upper threshold voltage distribution plot.) a width of the threshold voltage distribution of the memory cells connected to the outer channel may be OW1. A width of the threshold voltage distribution of the memory cells connected to the inner channel may be IW1. An interval between the right-side of the threshold voltage distribution of the memory cells connected to the outer channel and the right side of the threshold voltage distribution of the memory cells connected to the inner channel may be R1. An interval between left sides may be L1. For program loop PGMLoop1, the threshold voltage Vth distribution difference L1 is greater than the threshold voltage Vth distribution difference R1.

A program loop PGMLoop2 may be a loop in which the program operation is more progressed than the program loop PGMLoop1.

In the program loop PGMLoop2, (Refer to the lower voltage threshold distribution plot in FIG. 7.) the width of the threshold voltage Vth distribution of the memory cells connected to the outer channel may be OW2. The width of the threshold voltage Vth distribution of the memory cells connected to the inner channel may be IW2. The interval between the right side of the threshold voltage distribution of the memory cells connected to the outer channel and the right side of the threshold voltage distribution of the memory cells connected to the inner channel may be R2. The interval between the left sides may be L2.

Comparing the shapes of the threshold voltage distributions plots for the two program loops PGMLoop1 and PGMLoop2, the threshold voltage distribution widths IW1 and IW2 of the memory cells connected to the inner channel are similar to each other. On the other hand, the threshold voltage distribution widths OW1 and OW2 of the memory cells connected to the outer channel are different and increase from OW1 to OW2. In FIGS. 7, R1 and R2 are similar, but L2 may be greater than L1.

In other words, a characteristic of the memory cells connected to the outer channel may be poor in particular, a characteristic of the memory cells positioned on the left side of the threshold voltage distribution may be poor.

Figure 8:
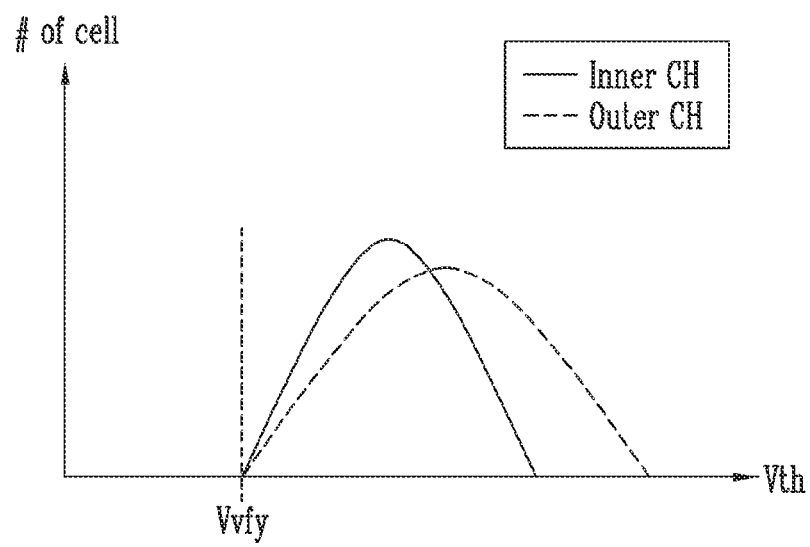
FIG. 8 is a diagram illustrating a threshold voltage distribution of memory cells for which program is completed for an inner channel and an outer channel.

FIG. 8 is a diagram illustrating a threshold voltage distribution of memory cells for which programming is completed for each of the inner channel and the outer channel.

Referring to FIG. 8, the characteristic of the memory cells connected to the outer channel may be worse than that of the memory cells connected to the inner channel. Therefore, since more programming pulses are applied to the memory cells connected to the outer channel than to the memory cells connected to the inner channel until programming is complete, the threshold voltage distribution may be further shifted to the right.

Figure 9:
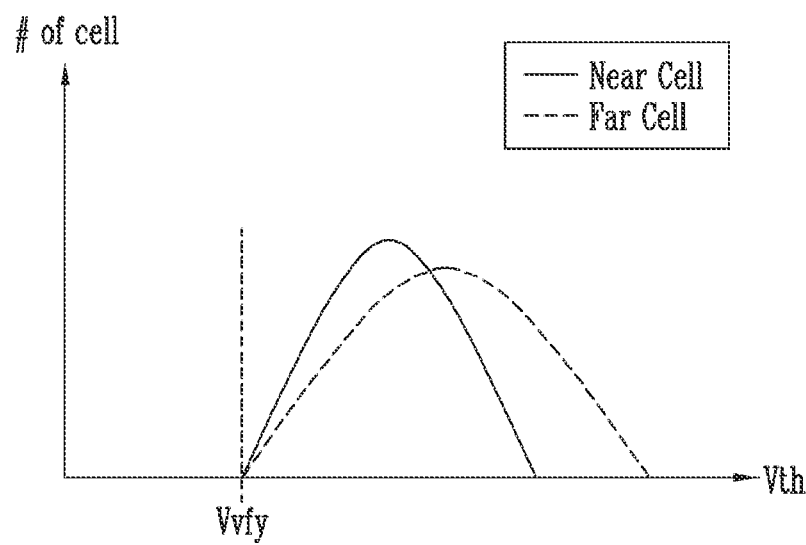
FIG. 9 is a diagram illustrating a threshold voltage distribution of memory cells for which program is completed for a near memory cell and a far memory cell.

FIG. 9 is a diagram illustrating a threshold voltage distribution of memory cells for which programming is completed for each of a near memory cell and a far memory cell.

Referring to FIG. 9, since a word line resistance increases as the distance from the address decoder increases, a characteristic of the far memory cells may be worse than that of the near memory cells. Therefore, since more programming pulses are applied to the far memory cells than to the near memory cells until programming is completed, the threshold voltage distribution may be further shifted right.

Figure 10:
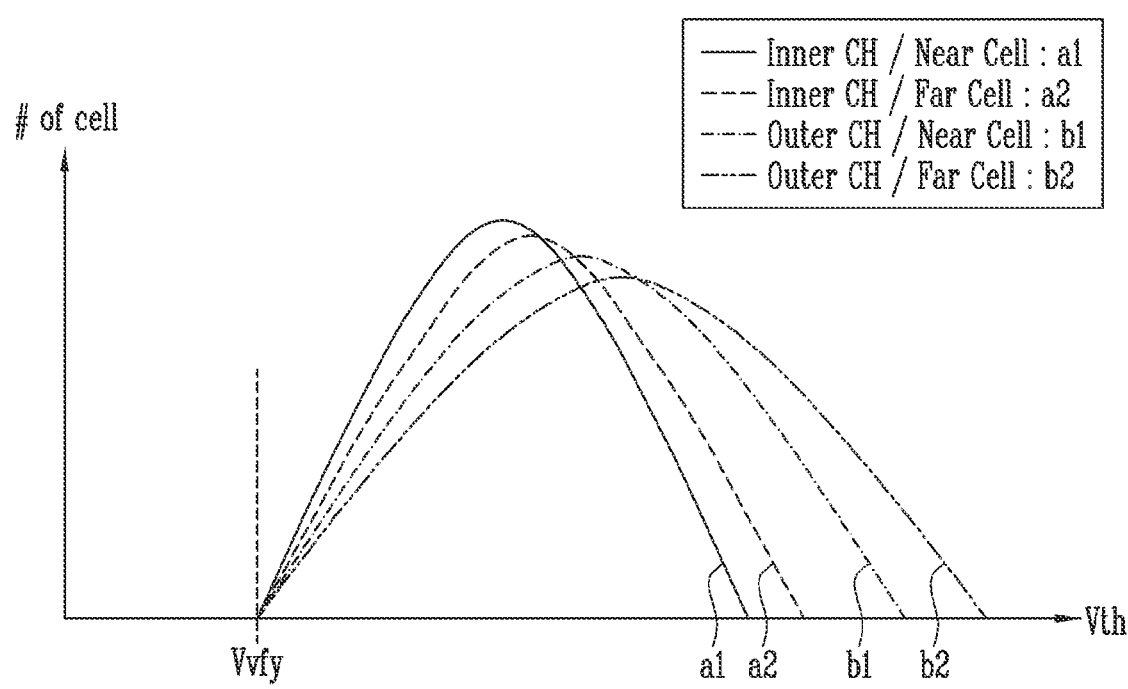
FIG. 10 is a diagram illustrating a threshold voltage distribution of memory cells for which program is completed for an inner channel, outer channel, a near memory cell, and a far memory cell.

FIG. 10 is a diagram illustrating a threshold voltage distribution of memory cells for which programming is completed for each of the inner channel, the outer channel, the near memory cell, and the far memory cell.

Referring to FIG. 10, characteristics of the memory cells according to the position of the channel may be shown with the inner channel and the outer channel and characteristics of the memory cells according to the distance from the address decoder may be shown with the near memory cell and the far memory cell.

A near memory cell connected to the inner channel may be a1. A far memory cell connected to the inner channel may be a2. A near memory cell connected to the outer channel may be b1. A far memory cell connected to the outer channel may be b2.

Referring to FIG. 10, it may be seen that a characteristic of the outer channel and the far memory cell is the worst.

Figure 11:
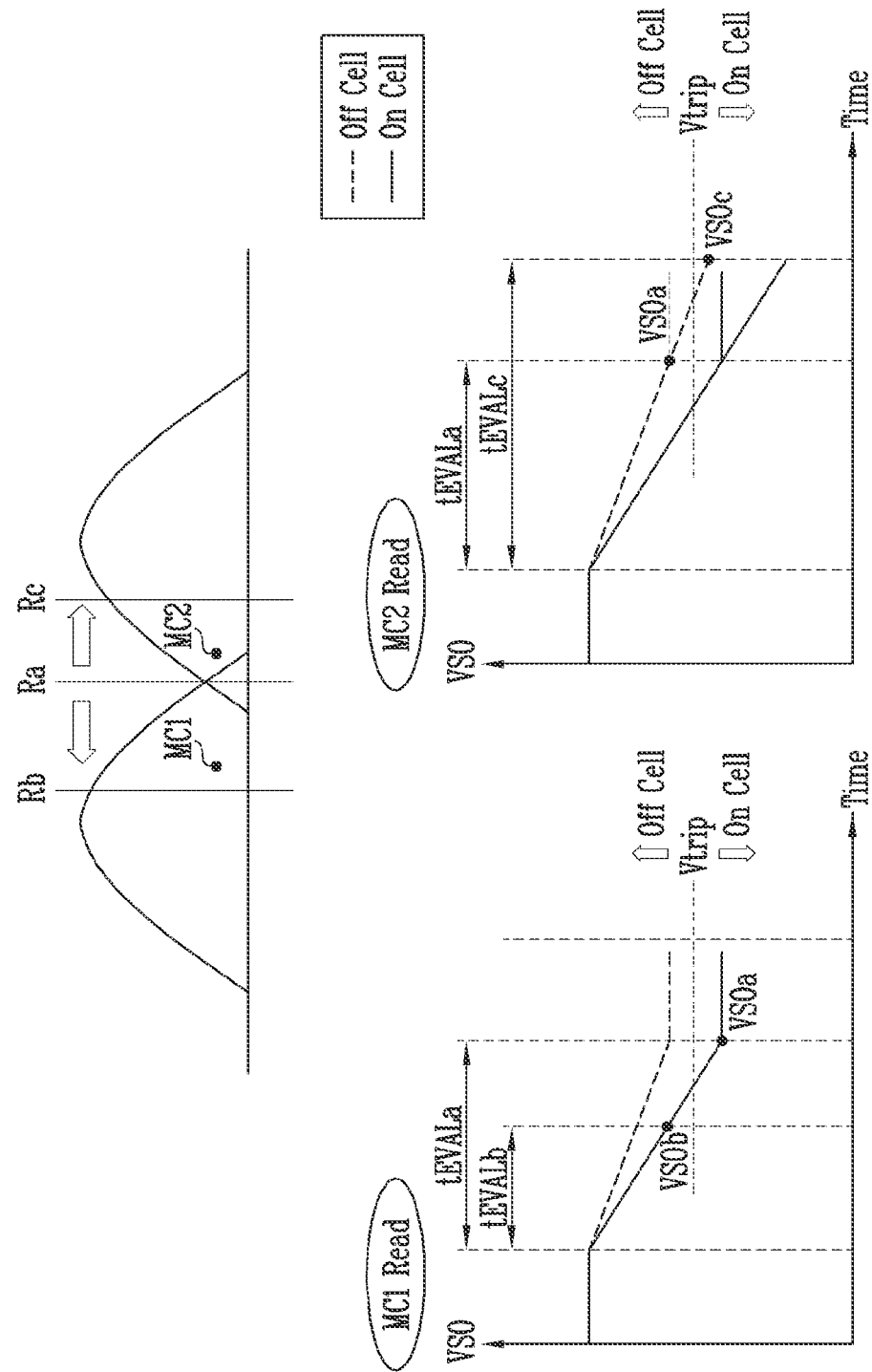
FIG. 11 is a diagram illustrating a read voltage change according to a sensing time change.

FIG. 11 is a diagram illustrating a change of the read voltage according to a change of a sensing time.

Referring to FIG. 11, a first read voltage Ra may be a read voltage for reading selected memory cells MC1 and MC2. A second read voltage Rb may be less than the first read voltage Ra. A third read voltage Rc may be greater than the first read voltage Ra.

The first memory cell MC1 may be read as an on-cell by the first read voltage Ra. The first memory cell MC1 may be read as an off-cell by the second read voltage Rb. The second memory cell MC2 may be read as an off-cell by the first read voltage Ra. The second memory cell MC2 may be read as an on-cell by the third read voltage Rc.

In an embodiment, the read operation may be performed in a method of applying the same read voltage to the selected word line connected to the selected memory cell and differently setting lengths of evaluation periods in which an evaluation signal is activated. The evaluation signal may be a signal for sensing data stored in the memory cell. The sensing time may be determined according to the length of the evaluation period.

For example, during the read operation, the same first read voltage Ra may be applied to the selected word line connected to the selected memory cell, and the length of the evaluation period tEVAL may be differently set. In this case, read data identical to that obtained by performing a read operation by applying different second and third read voltages Rb and Rc to the selected word line may be obtained.

In an embodiment, when a voltage VSO of a sensing node is greater than a reference voltage Vtrip, the selected memory cell may be read as an off-cell. When the voltage VSO of the sensing node is less than the reference voltage Vtrip, the selected memory cell may be read as an on-cell. The voltage VSO of the sensing node may be measured differently according to the length of the evaluation period tEVAL.

A first evaluation period corresponding to the first read voltage Ra may be tEVALa. A second evaluation period corresponding to the second read voltage Rb may be tEVALb. A third evaluation period corresponding to the third read voltage Rc may be tEVALc.

In a read operation on the first memory cell MC1, since the second read voltage Rb is lower than the first read voltage Ra, the second evaluation period tEVALb may be set shorter than the first evaluation period tEVALa.

The voltage of the sensing node measured according to the first evaluation period tEVALa may be VSOa. Since VSOa is less than the reference voltage Vtrip, the first memory cell MC1 may be read as the on-cell. The voltage of the sensing node measured according to the second evaluation period tEVALb may be VSOb. Since VSOb is greater than the reference voltage Vtrip, the first memory cell MC1 may be read the off-cell.

In a read operation on the second memory cell MC2, since the third read voltage Rc is greater than the first read voltage Ra, the third evaluation period tEVALc may be set longer than the first evaluation period tEVALa.

The voltage of the sensing node measured according to the first evaluation period tEVALa may be VSOa. Since VSOa is greater than the reference voltage Vtrip, the first memory cell MC1 may be read as the off-cell. The voltage of the sensing node measured according to the third evaluation period tEVALc may be VSOC. Since VSoc is less than the reference voltage Vtrip, the second memory cell MC2 may be read as the on-cell.

In an embodiment, the memory device may obtain the same result as performing a read operation by applying a different read voltage to the word line by adjusting the length of the evaluation period. tEVALa may be a reference evaluation period for sensing the selected memory cell with the read voltage applied to the selected word line.

For example, the first memory cell MC1 may be read as the off-cell by the second read voltage Rb. That is, a result of applying the second read voltage Rb to the selected word line and reading the first memory cell MC1 according to the reference evaluation period and a result of applying the first read voltage Ra to the selected word line and reading the first memory cell MC1 according to the second evaluation period tEVALb may be the same.

The second memory cell MC2 may be read as the on-cell read by the third read voltage Rc. That is, a result of applying the third read voltage Rc to the selected word line and reading the second memory cell MC2 according to the reference evaluation period and a result of applying the first read voltage Ra to the selected word line and reading the second memory cell MC2 according to the third evaluation period tEVALc may be the same.

In other words, even though the same read voltage is applied to the selected word line, an effect of reading with different read voltages may be obtained by differently setting the evaluation period included in the sensing time. An effect of changing the read voltage may be obtained as the sensing time is adjusted. The read operation according to an embodiment may be similarly applied to the program verify operation.

Figure 12:
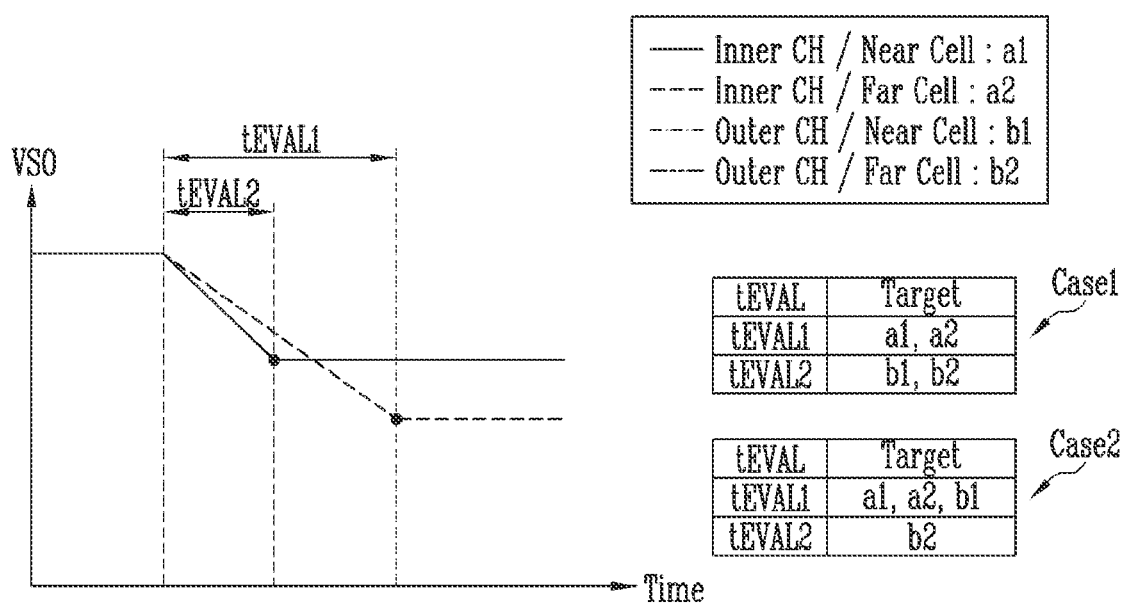
FIG. 12 is a diagram illustrating a sensing time setting according to an embodiment.

FIG. 12 is a diagram illustrating a sensing time setting according to an embodiment.

Referring to FIG. 12, the sensing time described with reference to FIG. 11 may be adjusted to improve the threshold voltage distribution described with reference to FIG. 10. Since an effect in which the verify voltage is decreased as the sensing time is shortened, a phenomenon in which the threshold voltage distribution is shifted to the right side from a normal distribution may be improved. In addition, a difference between the left side distributions may be reduced compared to the normal distribution. The difference between the left side distributions may be L1 and L2 described with reference to FIG. 7.

The near memory cell connected to the inner channel may be a1. The far memory cell connected to the inner channel may be a2. The near memory cell connected to the outer channel may be b1. The far memory cell connected to the inner channel may be b2.

In an embodiment, the evaluation period of a1 and a2 may be set to tEVAL1, and the evaluation period of b1 and b2 may be set to tEVAL2 shorter than tEVAL1. This is to improve threshold voltage distributions of the memory cells b1 and b2 connected to the outer channel of which the characteristic of the memory cell is poor, compared to the memory cells a1 and a2 connected to the inner channel.

In an embodiment, the evaluation periods of a1, a2, and b1 may be set to tEVAL1, and the evaluation period of b2 may be set to tEVAL2 shorter than tEVAL1. This is to improve the threshold voltage distribution of b2 which is the far memory cell connected to the outer channel of which the characteristic of the memory cell is the worst as described with reference to FIG. 10.

Figure 13A:
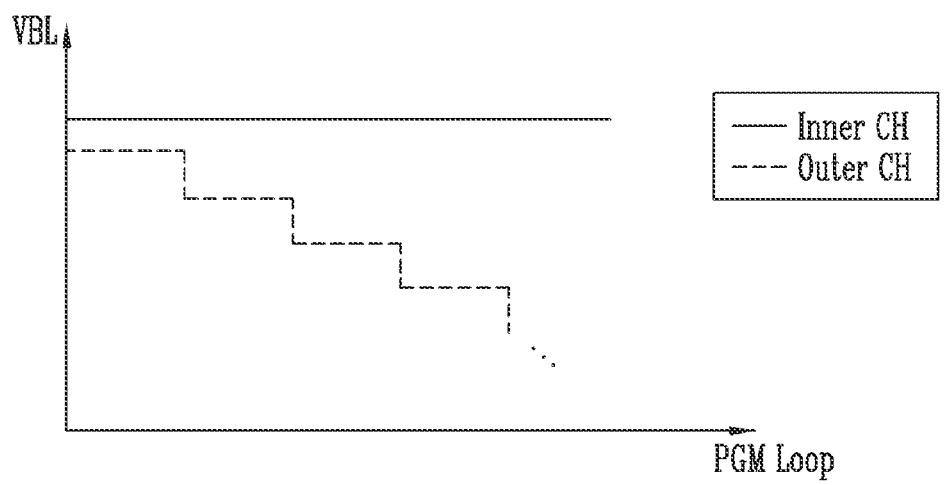
FIGS. 13A and 13B are diagrams illustrating a bit line voltage applied to a bit line as a program loop is executed according to an embodiment.
Figure 13B:
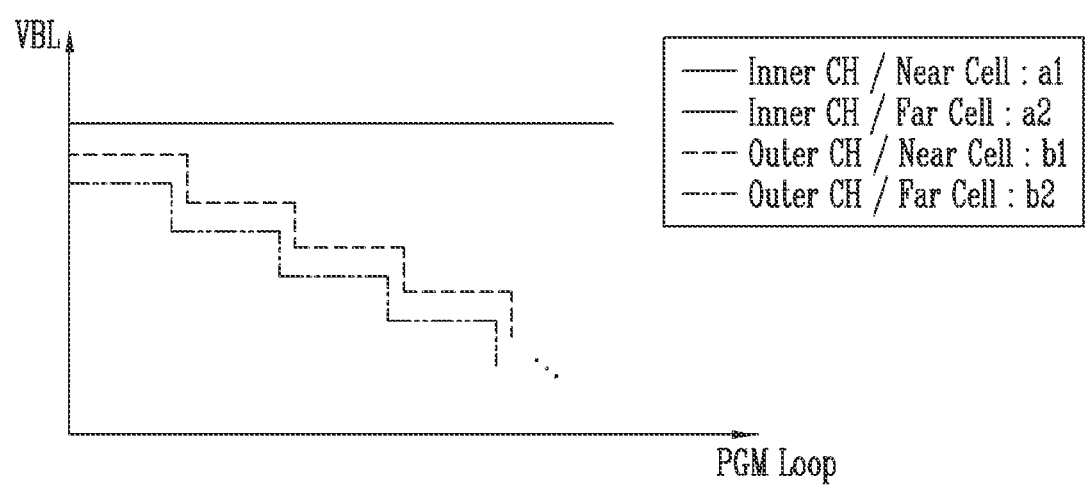

FIGS. 13A and 13B are diagrams illustrating a bit line voltage applied to a bit line as a program loop is progressed in a program operation according to an embodiment.

Referring to FIG. 13A, since the memory cells connected to the outer channel are programmed more slowly than the memory cells connected to the inner channel, a lesser bit line voltage may be applied to bit lines connected to the memory cells connected to the outer channel, in order to increase an effective program bias. In addition, since a difference of characteristics increases as the program loop is progressed, a magnitude of the bit line voltage applied to the bit lines connected to the memory cells connected to the outer channel may be decreased.

Referring to FIG. 13B, the far memory cells may be programmed more slowly than the near memory cells. Therefore, a bit line voltage less than that of the near memory cells connected to the outer channel may be applied to the bit lines connected to the far memory cells connected to the outer channel, in order to increase an effective program bias. In addition, as the program loop is progressed, a magnitude of the bit line voltage applied to the bit lines connected to the far memory cells and the near memory cells connected to the outer channel may be decreased.

Figure 14:
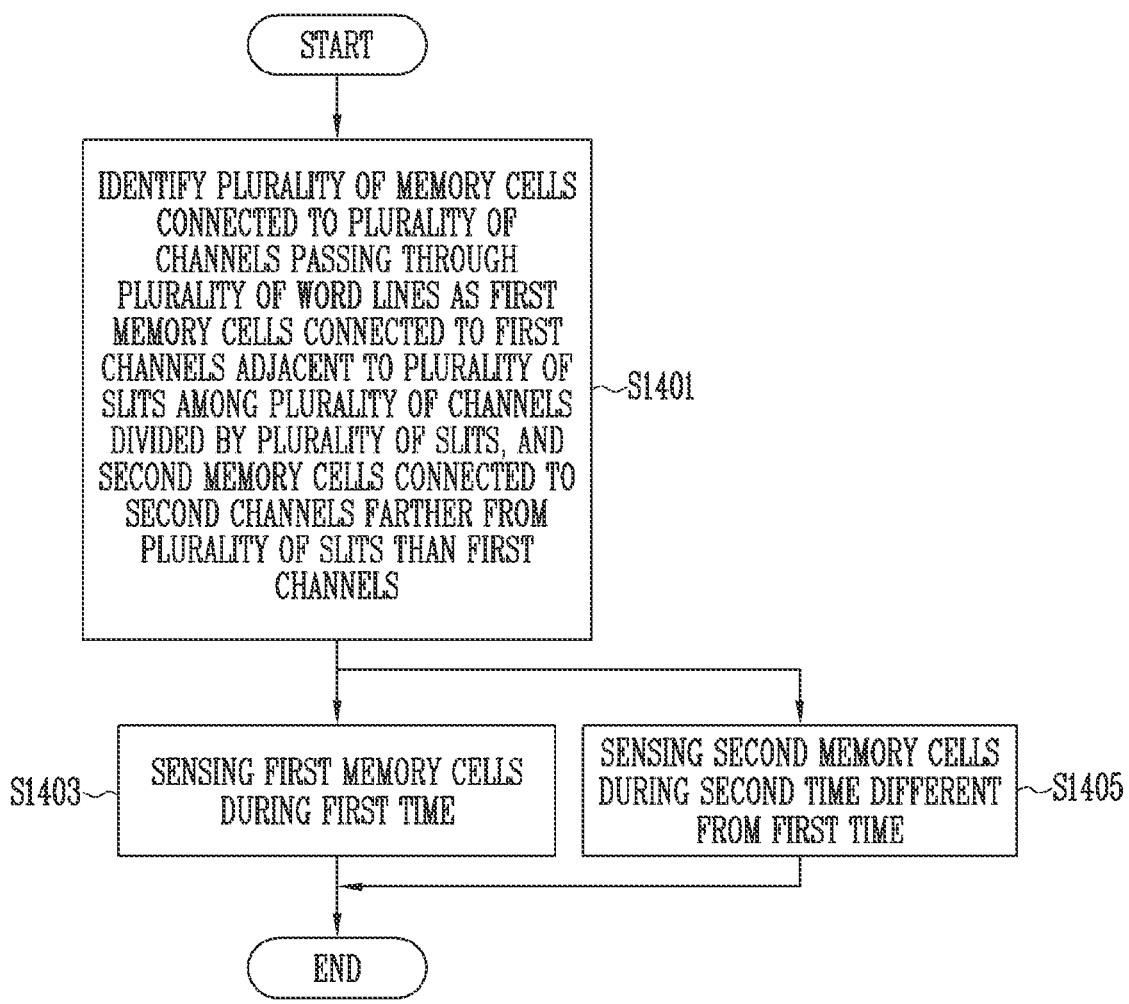
FIG. 14 is a flowchart illustrating an operation of a memory device according to an embodiment.

FIG. 14 is a flowchart illustrating an operation of a memory device according to an embodiment.

Referring to FIG. 14, in step S1401, the memory device may identify the plurality of memory cells connected to the plurality of channels passing through the plurality of word lines as the first memory cells connected to the first channels adjacent to the plurality of slits among the plurality of channels divided by the plurality of slits, and the second memory cells connected to the second channels farther from the plurality of slits than the first channels.

In step S1403, the memory device may sense the first memory cells during a first time.

In step S1405, the memory device may sense the second memory cells during a second time different from the first time.

Steps S1403 and S1405 may be performed in parallel in time.

Figure 15:
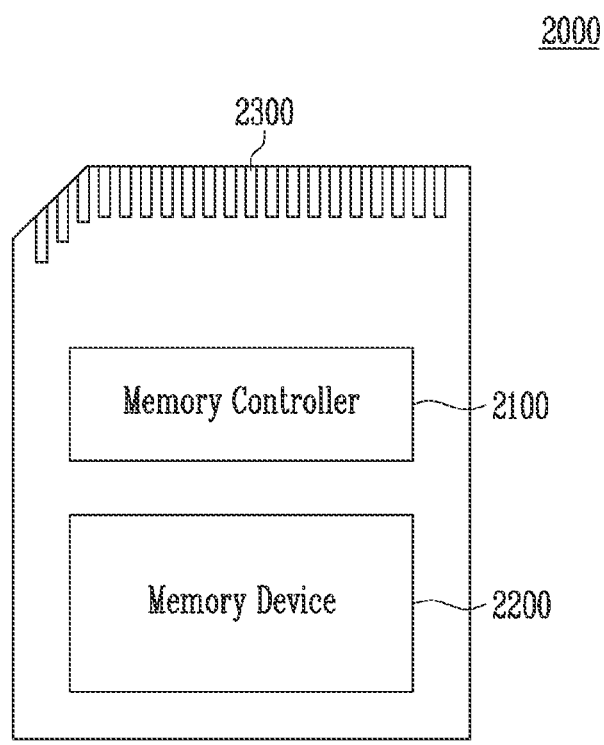
FIG. 15 is a block diagram illustrating a memory card system to which a storage device according to an embodiment of the present disclosure is applied.

FIG. 15 is a block diagram illustrating a memory card system to which a storage device according to an embodiment of the present disclosure is applied.

Referring to FIG. 15, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1.

For example, the memory controller 2100 may include components such as a random access memory (RAM), a processor, a host interface, a memory interface, and an ECC.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque-magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMC micro, or eMMC), an SD card (SD, mini SD, micro SD, or SDHC), and a universal flash storage (UFS).

Figure 16:
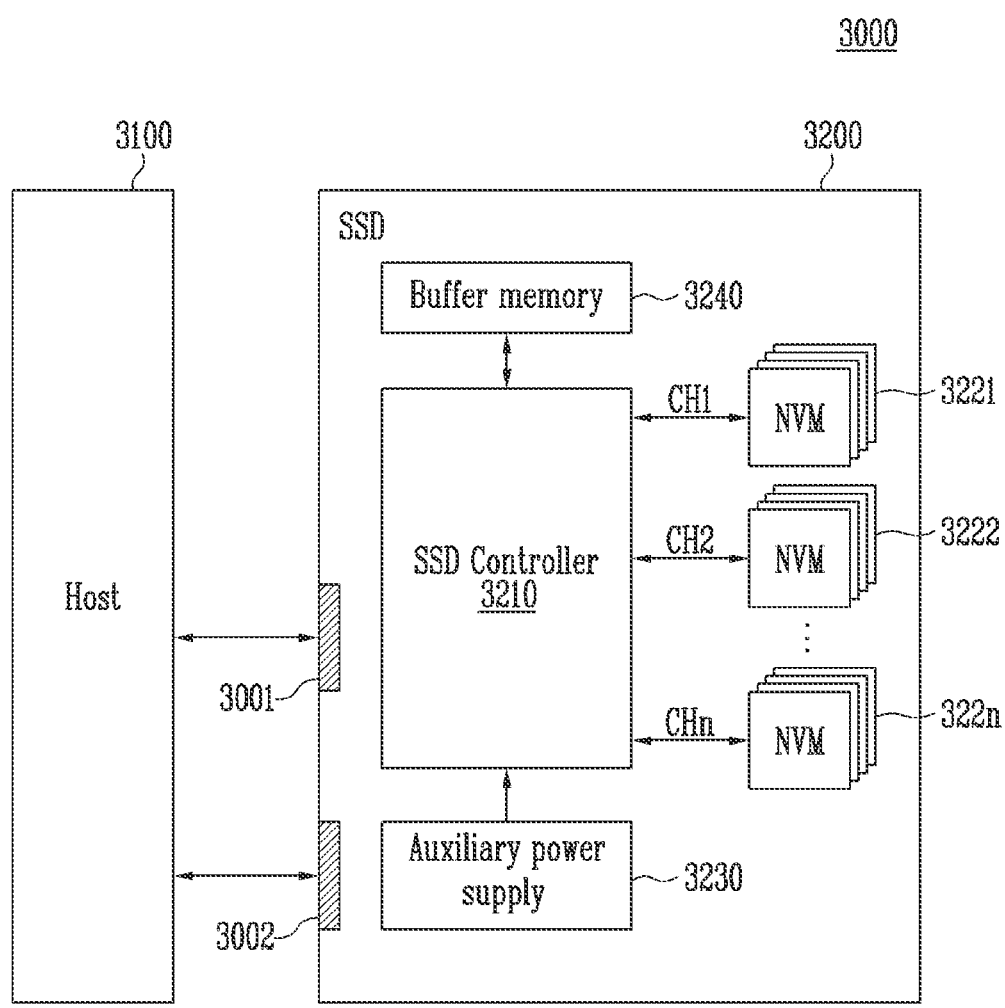
FIG. 16 is a block diagram illustrating a solid state drive (SSD) system to which a storage device according to an embodiment of the present disclosure is applied.

FIG. 16 is a block diagram illustrating a solid state drive (SSD) system to which a storage device according to an embodiment of the present disclosure is applied.

Referring to FIG. 16, the SSD system 3000 includes a host 3100 and an SSD 3200. The SSD 3200 exchanges a signal with the host 3100 through a signal connector 3001 and receives power through a power connector 3002. The SSD 3200 includes an SSD controller 3210, a plurality of flash memories 3221 to 322*n*, an auxiliary power device 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322*n* in response to the signal received from the host 3100. For example, the signal may be signals based on an interface between the host 3100 and the SSD 3200. For example, the signal may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3230 is connected to the host 3100 through the power connector 3002. The auxiliary power device 3230 may receive the power from the host 3100 and may charge the power. The auxiliary power device 3230 may provide power of the SSD 3200 when power supply from the host 3100 is not smooth. For example, the auxiliary power device 3230 may be positioned in the SSD 3200 or may be positioned outside the SSD 3200. For example, the auxiliary power device 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322*n*, or may temporarily store meta data (for example, a mapping table) of the flash memories 3221 to 322*n*. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

What is claimed is:

1. A memory device comprising:
   first memory cells connected to first channels adjacent to a plurality of slits, among a plurality of channels that pass through a plurality of word lines and are separated by the plurality of slits;
   second memory cells connected to second channels farther from the plurality of slits than the first channels among the plurality of channels;
   a read and write circuit configured to perform a sensing operation on the first memory cells and the second memory cells connected to a selected word line among the plurality of word lines; and
   a program controller configured to control the read and write circuit to perform the sensing operation during different sensing time periods for the first memory cells and the second memory cells.

2. The memory device of claim 1, wherein the sensing time period for the first memory cells is shorter than the sensing time period for the second memory cells,
   wherein the first memory cells and the second memory cells are formed in stacked semiconductor layers, and
   wherein the first channels and the second channels pass through the semiconductor layers and comprise column-shaped semiconductor material extending through the semiconductor layers.

3. The memory device of claim 1, wherein during a program operation on the first memory cells and the second memory cells, the program controller controls the read and write circuit to apply a first bit line voltage to first bit lines connected to the first memory cells and apply a second bit line voltage to second bit lines connected to the second memory cells, and
   wherein the first bit line voltage and second bit line voltage are different from each other.

4. The memory device of claim 3, wherein the first bit line voltage is less than the second bit line voltage.

5. The memory device of claim 3, wherein the read and write circuit applies a bit line voltage to the first bit lines in a first program loop, and
   wherein the read and write circuit applies a third bit line voltage less than the first bit line voltage to the first bit lines in a second program loop performed after the first program loop.

6. The memory device of claim 1, wherein the first memory cells include first near memory cells and first far memory cells, near and far being distances that are relative to a distance of corresponding memory cells from an address decoder, and
   the second memory cells include second near memory cells and second far memory cells distinguished according to a relative distance from the address decoder.

7. The memory device of claim 6, wherein the program controller controls the read and write circuit to perform a sensing operation on the first far memory cells during a sensing time period that is shorter than a sensing time period for the second memory cells and the first near memory cells.

8. The memory device of claim 6, wherein the program controller applies bit line voltages to first bit lines connected to the first memory cells and bit line voltages to second bit lines connected to the second memory cells during a program operation on the first memory cells and the second memory cells, and
   wherein the bit line voltage applied to the first bit lines is different from the bit line voltage applied to the second bit lines.

9. The memory device of claim 8, wherein the program controller applies different bit line voltages to third bit lines connected to the first near memory cells and fourth bit lines connected to first far memory cells among the first bit lines during the program operation.

10. The memory device of claim 9, wherein the read and write circuit applies a bit line voltage less than that of the second bit lines to the first bit lines and applies a bit line voltage less than that of the third bit lines to the fourth bit lines during the program operation.

11. The memory device of claim 9, wherein the read and write circuit applies a bit line voltage less than that of a previous program loop to the third bit lines and the fourth bit lines as a program loop is progressed.

12. The memory device of claim 1, wherein the plurality of slits include a first target slit and a second target slit adjacent to each other,
    the first channels include channels positioned within a reference distance from the first target slit or the second target slit, and
    the second channels include channels positioned outside the reference distance from the first target slit and the second target slit.

13. The memory device of claim 1, wherein the plurality of slits include a first target slit and a second target slit adjacent to each other,
    the first channels include channels positioned outside a reference distance from a middle of the first target slit and the second target slit, and
    the second channels include channels positioned within the reference distance from the middle of the first target slit and the second target slit.

14. A method of operating a memory device, the method comprising:
    performing a sensing operation during a first time period on first memory cells connected to first channels located away from a plurality of slits; and
    performing a sensing operation, during a second time period different from the first time period, on second memory cells connected to second channels located farther away from the plurality of slits than the first channels,
    wherein the first channels and the second channels pass through a plurality of word lines and are distinguished according to a distance from the plurality of slits.

15. The method of claim 14, wherein the first time period is shorter than the second time period.

16. The method of claim 14, further comprising:
    applying respectively different bit line voltages to first bit lines connected to the first memory cells and second bit lines connected to the second memory cells in a programming operation on the first memory cells and the second memory cells.

17. The method of claim 16, wherein applying the different bit line voltages comprises:
    applying a first bit line voltage to the first bit lines; and
    applying a second bit line voltage greater than the first bit line voltage to the second bit lines.

18. The method of claim 17, wherein applying the first bit line voltage comprises decreasing a magnitude of the first bit line voltage as a program loop is executed.

19. The method of claim 14, wherein the plurality of slits include a first target slit and a second target slit adjacent to each other,
- the first channels include channels positioned within a reference distance from the first target slit and the second target slit, and
- the second channels include channels positioned beyond the reference distance from the first target slit and the second target slit.

20. The method of claim 14, wherein the plurality of slits include a first target slit and a second target slit adjacent to each other,
- the first channels include channels positioned outside a reference distance from a middle of the first target slit and the second target slit, and the second channels include channels positioned within the reference distance from the middle of the first target slit and the second target slit.

* * * * *